US006261469B1

(12) United States Patent
Zakhidov et al.

(10) Patent No.: US 6,261,469 B1
(45) Date of Patent: Jul. 17, 2001

(54) THREE DIMENSIONALLY PERIODIC STRUCTURAL ASSEMBLIES ON NANOMETER AND LONGER SCALES

(75) Inventors: Anvar Zakhidov, Randolph; Ray Baughman, Morris Plains; Changxing Cui, Whippany; Ilyas I. Khayrullin, Flanders, all of NJ (US); Lo-Min Liu, Fresh Meadows; Igor Udod, Monsey, both of NY (US); Ji Su, Highland Park; Mikhail Kozlov, Morristown, both of NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/170,826

(22) Filed: Oct. 13, 1998

(51) Int. Cl.$^7$ ..................................................... C23F 4/04
(52) U.S. Cl. ......................... 216/56; 427/128; 427/249.2; 427/255.12
(58) Field of Search ........................ 216/56, 99; 427/128, 427/249.2, 249.6, 249.8, 250, 255.6, 255.12

(56) References Cited

U.S. PATENT DOCUMENTS

| 3,497,367 | 2/1970 | Gaskin et al. | 106/42 |
|---|---|---|---|
| 4,049,781 | 9/1977 | Acker et al. | 423/338 |
| 4,263,268 | * | 4/1981 | Knox et al. | 423/449 |

FOREIGN PATENT DOCUMENTS 853030   11/1960   (GB) .

OTHER PUBLICATIONS

Baughman et al "Nanostructured thermoelectrics based on periodic composites from opals and opal replicas" 17th Intl. Conf Thermoelectrics, pp. 288–293, May 24–28, 1998.*

Cui et al "Face–centered–cubic nanostructured polymer foams" abstract APS Mtg, I13. 11, Mar. 1998.*

Zakhidov et al, "Diamond opal–replica photonic crystals and graphitic metallic photonic band gap structures" abstract APS mtg, S15.07, Mar. 1998.*

Holland et al "Synthesis of macroporous minerals with highly ordered three–dimensional arrays of spheroidal voids" Science, 281, pp 538–540, Jul. 24, 1998.*

(List continued on next page.)

Primary Examiner—Sharidan Carrillo
Assistant Examiner—Allen Olsen
(74) Attorney, Agent, or Firm—John G. Shudy, Jr.

(57) ABSTRACT

This invention relates to processes for the assembly of three-dimensional structures having periodicities on the scale of optical wavelengths, and at both smaller and larger dimensions, as well as compositions and applications therefore. Invention embodiments involve the self assembly of three-dimensionally periodic arrays of spherical particles, the processing of these arrays so that both infiltration and extraction processes can occur, one or more infiltration steps for these periodic arrays, and, in some instances, extraction steps. The product articles are three-dimensionally periodic on a scale where conventional processing methods cannot be used. Articles and materials made by these processes are useful as thermoelectrics and thermionics, electrochromic display elements, low dielectric constant electronic substrate materials, electron emitters (particularly for displays), piezoelectric sensors and actuators, electrostrictive actuators, piezochromic rubbers, gas storage materials, chromatographic separation materials, catalyst support materials, photonic bandgap materials for optical circuitry, and opalescent colorants for the ultraviolet, visible, and infrared regions.

28 Claims, 14 Drawing Sheets

OTHER PUBLICATIONS

Baughman R H et al; "Nanostructured Thermoelectrics based on periodic composites from opals and opal replicas. I. Bi–infiltrated opals". Seventeenth Intl. Conf. on Thermoelectrics. Proceedings ICT98 (CAT. No. 98th8365), Seventeenth Intl. Conf. on Thermoelectrics. Proceedings ICT98, Nagoya, Japan, May 24–28, 1998, pp. 288–293, XP000878508 1998, Piscataway, NJ, USA, IEEE, USA ISBN: 0-7803-4907-5.

Yoshino K et al: "Novel properties of nanoscale organic–inorganic systems and photonic crystals–conducting polymers in nanoscal eperiodic structures, microcavities and photonic crystals" 11th Intl. Conf. on Superlattices, Microstructures and Microdevices, 1998, Hurgada, Egypt, Jul. 27–31, 1998, vol.25, No. 1–2, pp. 325–341, XP000878651, Superlattices and Microstructures, 1999, Academic Press UK ISSN: 0749–6036.

Zakhidov A A et al: "CVD synthesis of carbon–based metallic photonic crystals" Fourth Intl. Conf. on Nanostructured Materials (NANO '98) Stockholm, Sweden, Jun. 14–19, 1998, vol.12, No. 508, pp. 1089–1095, XP004177176, Nanostructured Materials, 1999, Elsevier, USA ISSN: 0965–9773.

Busch K et al: "Photonic band gap formation in certain self–organizing systems" Physical Review E (Statistical Physics, Plasmas, Fluids, and Related Interdisciplinary Topics), Sep. 1998, APS Through AIP, USA, vol. 58, No. 3, pp. 3896–3908, XP002130697, ISSN: 1063–651X.

Baughman Ray H et al: "Novel phases of carbon" Proceedings of the 1998 Dallas Meeting; Dallas, TX, USA Mar. 29–Apr. 2, 1998, vol. 39 No. 1, Mar. 1998 (1998–03) p. 70 XP000878502, Polym Prepr Div Polym Chem Am Chem Soc; Polymer Preprints, Div. of Polymer Chemistry, American Chemical Society Mar. 1998 ACS, Washington, DC, USA.

Zakhidov A A et al: "Diamond Opal–Replica Photonic Crystals and Graphitic Metallic Photonic Band Gap Structures: Fabrication and Properties", Internet Article: Abstract Submitted for the Mar. 98 MTG of the American Physical Society, Online!, No. S15.07, Mar. 19, 1998, XP002130698 Los Angeles, Retrieved From The Internet: URL:http://positron.aps.org/BAPSMAR98/abs/G3720007.html retrieved on Feb. 16, 2000! .

Cui C et al: "Face–Centered–Cubic Nanostructured Pllymer Foams" Internet Article: Abstract Submitted for the MAR98 MTG of the American Physical Society, Online!, No. I13.11, Mar. 17, 1998, XP002130699 Los Angeles, Retrieved from the Internet: URL:http://positron.aps.org/BAPSMAR98/abs/G1630011.html retrieved on 2000–02–16.

Skinner D P et al: "Flexible Composite Transducers" Materials Research Bulletin, US, Elsevier Science Publishing, New York., vol. 13, No. 6, Jan. 1, 1978, pp. 599–607, XP000563227, ISSN: 0025–5408.

Bogomolov, et al., *Phys. Solid State*, vol. 37, No. 11, Nov. 1995, pp. 1874–1878.

Velev, et al., *Nature*, vol 389, Oct. 1997, pp. 447–448.

Wijnhoven, et al., *Science*, vol. 281, Aug. 1998, pp. 802–804.

Holland, et al., *Science*, vol. 281, Jul. 24, 1998, pp. 538–540.

Imhof, et al., *Nature*, vol. 389, Oct. 30, 1997, pp. 948–951.

Daer, et al., *Journal of Applied Polymer Science*, vol. 45, 1992, pp. 2061–2073.

E. Matijevic, *MRS Bulletin*, Dec. 1989, pp. 18–20.

T. Sugimoto, *MRS Bulletin*, Dec. 1989, pp. 23–28.

Fievet, et al., *MRS Bulletin*, Dec. 1989, pp. 29–34.

Ward, et al., *MRS Bulletin*, Dec. 1989, pp. 41–46.

Fendler, et al., *Adv. Mater.*, vol. 7, No. 7, 1995, pp. 607–632.

A. Philipse, *Journal of Material Science Letters*, vol. 8, 1989, pp. 1371–1373.

Miguez, et al., *Appl. Phys. Lett*, vol. 71, No. 9, Sep. 1, 1997, pp. 1148–1150.

Lopez et al., *Superlattices and Microstructures*, vol. 22, No. 3, 1997, pp. 399–404.

Van Helden, et al., *Journal of Colloid and Interface Science*, vol. 81, No. 2, Jun. 1981, pp. 354–368.

Bartlett, et al., *J. Chem. Phys.*, vol. 93, No. 2, Jul. 15, 1990, pp. 1299–1312.

Barlett, et al., *Physical Review Letters*, vol. 68, No. 25, Jun. 22, 1992, pp. 3801–3804.

Förster, et al., *Adv. Mater.*, vol. 10, No. 3, 1998, pp. 195–217.

Mackay, et al., *Nature*, vol. 352., Aug. 29, 1991, p. 762.

R. Baughman, *Synthetic Metals*, vol. 78, 1996, pp. 339–353.

Miremadi, et al., *Sensors and Actuators B*, vol. 46, 1998, pp. 30–34.

Quinn, et al., *Carbon*, vol. 30, No. 7, 1992, pp. 1097–1103.

Aukett, et al., *Carbon*, vol. 30, No. 6, 1992, pp. 913–924.

Lin, et al., *Applied Polymer Symposium*, No. 21, 1973, pp. 143–152.

Underwood, et al., *Applied Physics Letters*, vol. 73, No. 3, Jul. 20, 1998, pp. 405–407.

van Blaaderen, et al, *Nature*, vol. 385, Jan. 23, 1997, pp. 321–324.

S. John, *Physical Review Letters*, vol. 58, No. 23, Jun. 8, 1987, pp. 2486–2489.

S. John, *Physics Today*, May 1991, pp. 32–40.

E. Yablonovitch, *Physical Review Letters*, vol. 58, No. 20, May 18, 1987, pp. 2059–2062.

Yablonovitch, et al., *Nature*, vol. 351, May 23, 1991, pp. 278.

Sievenpiper, et al., *Physical Review Letters*, vol. 76, No. 14, Apr. 1, 1996, pp. 2480–2483.

Hicks, et al., *Physical Review B*, vol. 47, No. 19, May 15, 1993, pp. 727–731.

Hicks, et al., *Appl. Phys. Lett.*, vol. 63, No. 23, Dec. 6, 1993, pp. 3230–3232.

Bhandari, et al., *CRC Handbook of Thermoelectrics* (Chapter 5), CRC Press, Florida, 1995, pp. 43–53.

Itoh, et al., *Adv. Mater.*, vol. 9, No. 15, 1997, pp. 1187–1190.

C. Tournut, *Macromol. Symp.*, vol. 82, 1994, pp. 99–109.

Brooks, et al., *J. Appl. Phys.*, vol. 75, No. 3, Feb. 1, 1994, pp. 1699–1704.

Oh, et al., *J. Am. Ceram. Soc.*, vol. 75, No. 4, 1992, pp. 795–799.

Furuta, et al., *Sensors and Materials*, vol. 3, No. 4, 1992, pp. 205–215.

Speck, et al., *Thin Solid Films*, vol. 165, 1988, pp. 317–322.

Jorgenson, et al., *Solar Energy Materials*, vol. 14, 1986, pp. 205–214.

Wallraff, et al., *Chemtech*, Apr. 1993, pp. 22–30.

Abdou, et al., *Chem. Mater.*, vol. 3, 1991, pp. 1003–1006.

Ralchenko, et al., *Diamond and Related Materials*, vol. 6, 1997, pp. 159–163.

* cited by examiner

THREE DIMENSIONALLY PERIODIC STRUCTURAL ASSEMBLIES ON NANOMETER AND LONGER SCALES

GOVERNMENT STATEMENT

This invention was made with Government support under Contract DAAB07-97-CJ036 awarded by the Department of Defense. The Government has certain rights in this invention.

BACKGROUND OF THE INVENTION

1. Field of the Invention

This invention relates to processes for the synthesis of three-dimensionally periodic structures and functional composites by the self-assembly of spheres, followed by one or more structure modification, infiltration, and extraction processes. These structures can be applied as thermoelectrics and thermionics, electrochromic display elements, low dielectric constant electronic substrate materials, electron emitters (particularly for displays), piezoelectric sensors and actuators, electrostrictive actuators, piezochromic rubbers, gas storage materials, chromatographic separation materials, catalyst support materials, photonic bandgap materials for optical circuitry, and opalescent colorants for the ultraviolet, visible, and infrared regions.

2. Description of Related Art

The art describes various means for fabricating articles with periodic structures that repeat on the scale of millimeters, such as by conventional machining methods. Methods are also available for the fabrication of articles having three-dimensional periodicities down to about 100 microns, such as desktop manufacturing methods. On the other extreme, three-dimensionally periodic structures with periodicities on the scale of angstroms can be obtained by conventional crystallization. In between these extremes there exists a manufacturability gap of from about 100 microns to about 10 nm, where it is presently difficult or impossible to fabricate three-dimensionally periodic structures from desired materials. The present invention enables the fabrication of such periodic structures in this manufacturability gap.

Two-dimensionally periodic structures can be created in this manufacturability bandgap using known methods, such as optical and electron beam lithography and mechanical embossing from lithographically produced surfaces. However, achievement of similar periodicity in the third dimension has provided the greatest problem. Limited success has been achieved in creating three-dimensionally periodic structures by the self-assembly of colloidal particles (especially colloidal particles that are spherical and nearly monodispersed in diameter). In addition, some researchers have been successful in filling porous periodic structures made of $SiO_2$ spheres with other materials, including, metals superconductors, and semiconductors [see V. N. Bogomolov et al. in Phys. Solid State 37, No. 11, 1874 (1995) and in Phys. Solid State 39, No. 11, 341 (1997)]. However, methods have not been discovered for the elimination of the $SiO_2$ spheres from the infiltrated structure, and the presence of these spheres can degrade the desired properties resulting from the infiltrated materials. Devising an overall process that preserves the structure of the three-dimensional array of infiltrated material, while at the same time enabling the extraction of the $SiO_2$ spheres, represents a higher level of difficulty which has not been addressed by the prior art.

The lack of more success in prior research reflects several generic issues. In order to conduct high temperature infiltration processes, it is necessary to use a first matrix material (such as an array of crystallized $SiO_2$ spheres) that is thermally and mechanically stable to above 300° C. However, extraction processes have not been successfully demonstrated for such thermally stable matrix materials. One reason is that it is topologically impossible to extract such matrix materials (unless the preextraction processes of this invention are utilized)—because the spheres of the matrix material are buried in the infiltrated material. Even if this topological problem could be solved, the unsolved problem still remains of conducting such extraction of a high-thermal-stability matrix material (like $SiO_2$) without disrupting the structure of the infiltrated material. There has, however, been some success in crystallizing low thermal stability polymers as matrix materials (which transform to a gas on heating), infiltrating these materials by low temperature processes, and then removing the original polymer particles by gas phase processes (resulting from polymer degradation). Specifically, Velev et al. [Nature 389, 447 (1997)] made three-dimensionally periodic shells of silica by using a chemical reaction to form the silica as a coating within polystyrene latex particle arrays, and then burning away the polystyrene (causing 20–35% shrinkage of the unit-cell parameter). Likewise, Wijnhoven and Vos (Science 281, 802 (1998)) made analogous crystals consisting of titania by assembling polystyrene latex spheres into a face-centered-cubic structure, chemically reacting tetrapropoxy-titane inside the polystyrene sphere structure (using up to eight penetration, reaction, and drying steps), and then burning away the polystyrene spheres (providing 33% shrinkage of the unit-cell parameter). A quite similar polystyrene-sphere-based method was used by B. T. Holland et al. [Science 281, 538 (1998)] to make titania, zirconia, and alumina. Such processes can avoid the above topological problem by using holes in the reacting coating layer (or layer permeability) to permit release of the gases produced by pyrolysis. However, this approach is generally unsatisfactory because of (1) inapplicability for materials that are most desirably infiltrated at high temperatures, (2) the difficulty of crystallizing the polymer spheres into well-ordered crystals having large dimensions, (3) the possible introduction of holes in the structure of the infiltrated material during gas evolution, (4) the occurrence of about 20–35% shrinkage of lattice parameter of the final structure relative to the initial structure, which can disrupt structural perfection, (5) inaccurate replication of the void space in the original structure (evident from the micrographs of the above references), (6) the lack of mechanical robustness of the polymer sphere assemblies (which again restricts the infiltration process), (7) the impossibility of obtaining complete filling of the void space of the original opal structure by the demonstrated chemical methods (so to obtain the volumetric inverse of the opal structure), and (8) the unsuitability of template removal by pyrolysis for the preparation of lattice structures comprised of thermally labile materials, such as polymers. As an alternative method, Imhof and Pine [Nature 389, 948 (1997)] have made periodic foams by using a sol-gel process to deposit materials in a self-assembly of monodispersed emulsion droplets. Barriers to application are provided by the lack of generality of this method, present inability to provide well-ordered materials of large dimensions by emulsion self-organization, the poor degree of order of the resulting product, and the large materials shrinkage during the drying step for the gel (about 50%).

What is needed and what the prior art has not provided is a means for forming three-dimensionally periodic structures with periodicities on the scale of 100 microns to 10 nm from arbitrarily chosen materials. Such materials are needed for a host of applications where the scale of the lattice periodicity profoundly effects properties. Moreover, the prior art has not demonstrated the ability to create the complicated, multi-component structures needed for advanced device applications. The formation of these multicomponent structures requires the ability to conduct multiple infiltration and extraction steps without substantially degrading regularity, the ability to control structural channel dimensions independent of unit-cell dimensions, the ability to conduct infiltrations at high temperatures, and the ability to controllably engineer breaks in the continuity of infiltrated materials by melt phase processes—none of which have been demonstrated by prior art processes leading to either a opal replica structure or a more complicated structure. Also, methods are needed for the creation of three-dimensionally periodic nanoscale structures with less than 26% volume filling from thermally unstable materials, such as organic polymers (and especially elastomeric polymers and piezoelectric polymers), and such methods do not exist in the prior art. In addition, there are no available methods in the prior art for making a material that is a fully filled volumetric inverse of the void space of an opal structure, and materials with such structures are required for the applications described herein.

SUMMARY OF INVENTION

The invention provides a process for the formation of a three-dimensionally-periodic porous structure, comprising the steps of (a) crystallizing spheres of material A into a first structure having three-dimensional periodicity, and voids between spheres, wherein the material A is mechanically and thermally stable to at least about 300° C., (b) treating this first structure so that necks are formed between the spheres of material A, (c) infiltrating said first structure with material B to form a A-B composite structure, and (d) removing material A from said A-B composite structure to form a second structure comprising material B.

The invention also provides a process for the formation of a structure having three-dimensional periodicity comprising a composite material A and an organic polymer B, comprising the steps of (a) crystallizing particles of material A into a first structure having three-dimensional periodicity and lattice repeat dimensions of from about 20 nm to about 100 $\mu$m, (b) infiltrating said first structure with either material B or a precursor thereof to form a A-B composite structure.

The invention further provides a process for the formation of a porous structure having three-dimensional periodicity comprising materials A and B, which comprises the steps of (a) crystallizing particles of material A into a first structure having three-dimensional periodicity, (b) treating the particles of material A so that interparticle necks are formed, (c) infiltrating said first structure with material B to form an A-B composite structure, and (d) partially or completely melting and solidifying either component A or B, but not both.

The invention still further provides a three-dimensionally periodic thermoelectric or thermionic composition containing surfaces or interfaces that are inverse replicas of the surfaces of a sphere array, wherein the sphere diameter is from about 20 nm to about 10 $\mu$m and the thermoelectric composition contains less than about 50 percent by volume of an electrically insulating composition.

The invention also provides a three-dimensionally-periodic piezoelectric ceramic, piezoelectric polymer, or electrostrictive material composition containing surfaces or interfaces that are inverse replicas of the surfaces of a sphere array, wherein the sphere diameter is from about 20 nm to about 100 $\mu$m and wherein an obtainable electrically generated strain is at least 1% for the electrostrictive composition.

The invention further provides a three-dimensionally-periodic electrically insulating structure containing surfaces or interfaces that are inverse replicas of the surfaces of a sphere array, wherein necks exists between neighboring spheres in said sphere array and the average sphere diameter does not exceed about 100 nm.

The invention still further provides a colorant for ultraviolet, visible or infrared wavelengths comprising a three-dimensionally-periodic structure containing surfaces or interfaces that are inverse replicas of the surfaces of a sphere array, wherein necks exists between neighboring spheres in said sphere array and the average sphere diameter is from about 20 nm to about 1 $\mu$m.

The invention yet further provides a process for substantially eliminating the coloration of a material comprising particles of a colorant in a matrix polymer wherein the particles of the colorant comprise an array which is three dimensionally periodic at visible wavelengths which process comprises heating the material to a temperature that is higher than the melting temperature of the colorant, and below the degradation temperature of the matrix polymer.

The invention still further provides an elastomer having a three-dimensionally-periodic structure that contains either (a) surfaces or interfaces that are inverse replicas of the surfaces of a sphere array or (b) elastomer spheres, wherein the sphere diameter is from about 20 nm to about 100 $\mu$m.

The invention also provides a periodic material comprising either a conducting form of diamond, diamond with hydrogenated surfaces, polycrystalline diamond where $sp^2$ carbons at grain boundaries confer electrical conductivity, diamond-like carbon, or nitrogen-doped diamond, wherein said periodic material contains surfaces or interfaces that are inverse replicas of the surfaces of a sphere array having a sphere diameter that is from about 20 nm to about 100 $\mu$m.

The invention also provides a three-dimensionally periodic material comprising graphite whose surfaces or interfaces are inverse replicas of the surfaces of a sphere array, wherein the sphere diameter is from about 20 nm to about 100 $\mu$m, wherein the sheets of said graphite are oriented with respect to the original surfaces of the spheres in said sphere array.

The invention also provides a three-dimensionally periodic material comprising carbon, whose surfaces or interfaces are inverse replicas of the surfaces of a sphere array, wherein the sphere diameter is from about 20 to about 100 $\mu$m, and the carbon is a foam having an average pore diameter of from about 4 Å to about 10 Å.

The invention also provides a three-dimensionally periodic material comprising at least three spatially separated compositions, wherein the interfaces between these compositions are inverse replicas of the surfaces of a sphere array, wherein the sphere diameter is from about 20 nm to about 100 $\mu$m.

BRIEF DESCRIPTION OF THE DRAWINGS

The invention will be more clearly understood and further applications will be apparent when reference is made to the following detailed description of preferred embodiments of the invention and the accompanying drawings, in which.

DETAILED DESCRIPTION OF THE INVENTION

The invention provides processes for the fabrication of structures that are three-dimensionally periodic on the scale where conventional manufacturing processes cannot be practiced. These structures are useful for a variety of applications because of the functionality provided by this periodicity. These applications include use as thermoelectrics and thermionics, electrochromic display elements, low dielectric constant electronic substrate materials, electron emitters (particularly for displays), piezoelectric sensors and actuators, electrostrictive actuators, piezochromic rubbers, gas storage materials, chromatographic separation materials, catalyst support materials, photonic bandgap materials for optical circuitry, and opalescent colorants for the ultraviolet, visible, and infrared regions.

Figure 9:
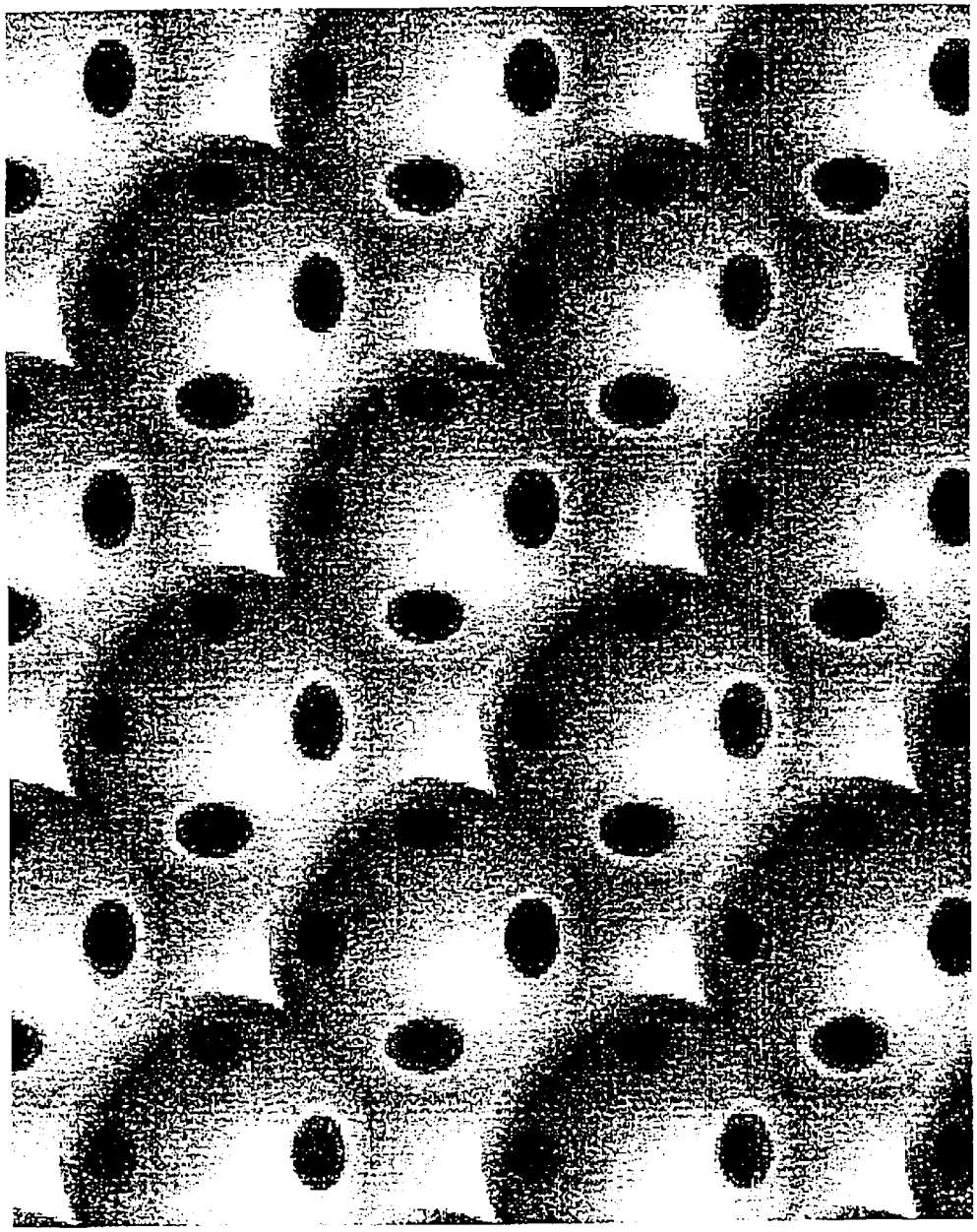
FIG. 9, for comparison with FIG. 8, is a model showing a (100) surface of a surface-templated inverse opal. The occurrence of fracture across sphere diameters, rather than at intersphere contact points, explains the difference between the FIG. 8 micrograph and this model.

A process that provides a preferred invention embodiment comprises the following basic steps. (I) The first step comprises assembling nearly monodispersed spheres of material A (such as 250 nm $SiO_2$ spheres) into an "opal-like" lattice. We use this term opal-like (or opal or opal template) to designate structures having a packing or spheres that is similar to the well-known packing of $SiO_2$ spheres in natural gem opal. In a preferred embodiment, such assembly is by a sedimentation process (whose rate can be enhanced by centrifugation) from a colloidal solution of the spheres. (II) In a second step, the spheres are partially joined together so that finite diameter necks connect neighboring particles, but the void space in the opal-like structure remains percolated. In a preferred embodiment, this partial joining of neighboring spheres is by sintering at high temperatures (which are preferably between 650 and 900° C. for $SiO_2$ spheres). (III) This partially sintered porous opal crystal is then used as a template for obtaining a three-dimensionally periodic assembly of a second material (material B), which is infiltrated into the opal during the third step. This B material can be either infiltrated into the opal so as to substantially fill the void space of the opal (which is called volumetric filling) or the B material can be infiltrated so as to provide only a coating on the interior surfaces of the opal (which is called surface filling). By infiltrated material we mean a material that is infiltrated either in a final or a precursor state. (IV) In the fourth step the initial opal material is dissolved or otherwise removed to obtain a hollow structure that is an inverse replica of the original opal structure. This inverse replica is either called a volumetrically-templated inverse opal (FIG. 3), if the step three infiltration of B was volumetric templating, or a surface-templated inverse opal (FIG. 9), if the step three infiltration of B was surface templating.

For the purposes of this invention, the following definitions are used. The primary opal template (or original opal)

is the initially formed periodic structure (from material A spheres) that has the desired lattice periodicity. In the most preferred embodiments, this primary opal template will be a porous lattice of $SiO_2$ spheres that are packed into a face-centered-cubic (fcc) lattice. These and structurally related derivative structures having a structure analogous to that of natural opal will be referred to as opals or opal templates independent of whether or not the spheres in the parent template are of $SiO_2$. Also, the structures obtained by partial or complete filling of the opal void space with a second material, followed by removal of the original opal lattice material, will be called inverse opals (independent of the chemical composition of the primary opal template).

In other invention embodiments this inverse opal replica is further transformed by additional processing. For example, the volumetrically-templated inverse opal is used as a template for the periodic deposition of a material C within the interstitial space left by the removal of the original spheres of material A. In another optional step, the material B can be removed, so as to result in a direct opal lattice comprising only material C. More complicated assembly processes can be accomplished for a surface-templated inverse opal of material B, since such inverse opal has two separate void spaces that are separately percolated, corresponding to the interiors and exteriors to the shell structure of the surface-templated inverse opal. Hence, these separate void spaces can be separately filled with either the same or different materials, called C, and $C_2$. Furthermore, the $C_1$ and $C_2$ materials can be infiltrated to provide either surface filling or volumetric filling. Additionally, a surface templating step with material $D_1$ can be followed sequentially by either surface filling in the same void channels by one or more other materials ($D_2$, $D_3$, and etc.) or by a volume filling process with a material $D_2$ in the same void channel. In addition partial or complete removal processes can be used for materials modification. For example, the spheres of the primary opal template can be of a material $A_1$ that is coated with a material $A_2$. After assembly of the $A_1/A_2$ composite spheres into a porous opal and infiltration of the pore space in this opal with material B, the material $A_2$ can be selectively removed, so as to provide spheres of material $A_1$ that are free to move in the matrix of material B.

The above step II of generating an extended interface between spheres is critical for producing inverse opals if the infiltrated material completely covers the internal surface of the A-material spheres in the primary opal template. This extended interface between spheres is most preferably generated by heating the opal-like sphere array to a temperature that is sufficiently high that sintering creates an intersphere neck between neighboring spheres. The temperature and times required for this sintering will depend upon the composition of the spheres, shorter times and higher temperatures typically being equivalent to longer times at lower temperatures. Such sintering process should preferably be accomplished at below the temperature at which the spheres become sufficiently fluid that a nearly spherical shape can not be maintained. To illustrate this approach, consider the embodiment of this invention where the A-material spheres are $SiO_2$ spheres in which the required interface is created by sintering. Such sintering is normally achieved by a two step annealing process. The first step is a low temperature anneal at typically 100–120° C. for 2–3 days to eliminate excess water, and the second step is typically a high temperature anneal at 650–800° C. for several hours (resulting in Si—O—Si linkages between the silica of two adjacent spheres). The flow of silica between spheres at high temperatures creates the necks of finite diameter (up to 125 nm for 250 nm spheres) without substantially changing the spherical shape of each ball. While sintering provides the inter-sphere interface through which the $SiO_2$ can be removed after infiltration, too much sintering prohibits infiltration by closing the passages between the octahedral and tetrahedral voids in the original fcc silica lattice. If the sintering provides $SiO_2$ spheres of diameter D=250 nm, which are separated by a shorter distance d, geometrical calculations indicate the narrow range of D/d that is compatible with both the infiltration and extraction processes. The narrowest channel constriction between octahedral and tetrahedral void spaces occurs on the (111) plane midway between six surrounding spheres, and has a diameter $\Delta=2(3)^{-1/2}d-D$ (which is 38 nm if D/d is unity and zero if D/d is above 1.155). With increasing D/d in this range, the diameter of the circular interface between nearest neighbor spheres $\delta=(D^2-d^2)^{1/2}$ increases from zero to $\delta=125$ nm. Infiltration and extraction processes can proceed through these narrow channels over millimeter opal thickness, thereby replicating periodic structural features of the original opal crystals (the primary opal template) down to the 10 nm scale.

For the purposes of this invention, the interparticle necks between spheres A need not be comprised of the material A. The guideline for the nature of these necks is that they should enable the formation of a continuous path for the extraction of material A from the surrounding material B. For example, such necks can be formed by infiltrating the material B in the lattice of A spheres so that the inter-sphere junctions are not completely filled with material B. Alternately, intersphere junctions suitable for the purposes of this invention can be formed by surface coating internal surface of the self-assembled array of A spheres with a material A*, which preferably can be removed by the same extraction process that removes the A spheres (after the infiltration of the material B. However, the most preferred method for forming the inter-particle necks between A particles is by sintering. Pressure, preferably hydrostatic pressure at elevated temperatures, can be used for forming mechanical deformation that leads to these interparticle necks. Moreover, the mechanical deformation caused by the application of non-hydrostatic mechanical stress (preferably at elevated temperatures) can be used to decrease the symmetry of the opal or derivative structures.

Depending upon the structure needed for a particular application, the primary opal template can be exposed to a chemical that alters the surface energy or structure of this opal prior to the infiltration of material B. For example, the surface of $SiO_2$ spheres can be made hydrophobic by reacting an organosilane (such as vinyltriethoxysilane and vinyltrichlorosilane) on this surface or by infiltrating a solution of a solid hydrocarbon (such as poly(o-phenylene)) into the opal, followed by evaporation of the solvent. Various methods can be employed for structural modification. For example, the selective dissolution of the opal spheres at non-neck regions of the spheres can be used to increase opal void volume without destroying the neck-generated interconnections that are required for the extraction of the A material after the infiltration of the B material. In this case, the partial dissolution of sintered $SiO_2$ opals with aqueous KOH reduces the sphere diameter (thereby increasing the void volume that is available for the infiltration of material B) without eliminating the interconnects resulting from sintering-generated intersphere necks.

The material A is preferably mechanically and thermally stable to at least about 300° C., more preferably at least about 500° C., and most preferably at least about 800° C. By mechanical and thermal stability to these temperatures we mean that these particles have sufficient stability at these temperature to largely maintain the structural regularity of opals based on these particles. By mechanical and thermal stability at the indicated temperature it is meant that degradation processes occurring at this temperature leaves a stable product which will not disappear by further gas evolution or fluidization at the specified temperature. Since the function of material A is to provide self-assembly of a crystal structure; to enable the infiltration of material B under desired conditions of temperature, pressure, and other surrounding conditions; and then to be partially or completely removable, these functions lead to the choice of material A. Material A is most preferably monodispersed $SiO_2$ spheres having a diameter of about 20 nm to about 100 $\mu$m. However, these A materials can be virtually any organic or inorganic composition that satisfies the above stability conditions. Examples are ceramics, salts, metals, carbon phases, and high thermal stability organic polymers.

Examples of preferred sphere types that are commercially available (for example, from Polysciences, Inc., 400 Valley Road, Warrington, Pa. 18976) are poly(tetrafluoroethylene) spheres (35 $\mu$m), poly(tetrafluoroethylene-propylene) spheres (10 $\mu$m), poly(vinyl chloride) spheres (300–400 $\mu$m), phenolic spheres (hollow, 5–127 $\mu$m), graphitized carbon particles (0.027–0.030 $\mu$m), colloidal gold particles, glass spheres (various sizes from 3 to 750 $\mu$m), hollow glass spheres (2 to 20 $\mu$m), and silica microspheres (0.05 $\mu$m to 0.45 $\mu$m). Some of these commercially available spheres are too polydispersed in diameter for direct self-assembly into opal type of structures. Hence, conventional methods of size separation should preferably be used prior to the self-assembly of the spheres into an opal lattice (such as sedimentation, repeated-self assembly, and sieving). Such methods for the separation of spheres according to size are described by A. J. Gaskin and P. J. Darragh in U.S. Pat. No. 3,497,367 (1970) which is incorporated herein by reference.

Also, some of these commercially available spheres are preferably converted into a more stable form prior to usage (such as by the pyrolysis of poly(vinyl chloride) or phenolic spheres to make carbon spheres). Likewise, the poly(vinyl chloride) spheres and poly(tetrafluoroethylene) spheres can be converted to carbon spheres using well known dehydrohalogenation and dehalogenation agents (such as alkali metals) prior to their use for forming the opal matrices. In addition, these spheres can be coated with materials that facilitate the self-assembly process, such as organosilanes for the glass spheres. A useful method for forming nearly monodispersed polymer spheres with diameters in desired range (using an aerosol generator), and of carbonizing such spheres of poly(furfuryl alcohol) or poly(vinyl acetate) to obtain carbon spheres having diameters in the range 20–150 $\mu$m, are described by K. M. Daer and Y. A. Levendis in Journal Applied Polymer Science 45, 2061 (1992). Such methods are useful for preparing spheres that self assemble into opals, which can be used for embodiments of the present invention. Other references that describe the preparation of colloidal particles that are useful for the practice of the present invention embodiments are E. Matijevic, Materials Research Bulletin, pp. 18–20 (December 1989), T. Sugimoto, Materials Research Bulletin, pp. 23–28 (December 1989), F. Fievet et al., Materials Research Bulletin, pp. 29–34 (December 1989), A. J. I. Ward and S. E. Friberg, Materials Research Bulletin, pp. 41–46 (December 1989), and J. H. Fender and F. C. Meldrum, Advanced Materials 7, 607 (1995).

For the purposes of this invention the term sphere includes near spherical particles that pack similarly to spheres (such as oblong or icosohedral particles). Various methods well known in the art can be used to assemble the A-material spheres of the primary opal template used for the processes of the present invention. The most preferred method is by the slow sedimentation of a colloidal suspension of nearly monodispersed spheres. These spheres preferably differ in radii by no more than a factor of 1.05. This crystallization can be optionally accelerated by the application of an electric or magnetic field or field gradient, or by using a centrifuge. Also, in order to accelerate the crystallization process, one can optionally use a low viscosity fluid as the suspension medium for the colloidal particles, such as supercritical water or carbon dioxide. For sphere sizes that are large, typically above 10 $\mu$m, such sphere assembly can optionally be accomplished by the mechanical vibration of either a dry or wet assembly of spheres. As examples of such methods, the porous silica opals used as templates can be made by published methods used by the jewelry industry to fabricate gem quality synthetic opal. For descriptions of these methods see A. P. Philipse, J. Mater. Sci. Lett. 8, 1371 (1987); H. Míguez et al. Appl. Phys. Lett. 71, 1148 (1997); C. López, L. Míguez, L. Vázquez, F. Meseguer, R. Mayoral, and M. Ocaña, Superlattices and Microstructures 22, 399 (1997); N. D. Deniskina, D. V. Kalinin, and L. K. Kazantseva, Gem Quality Opals, Their Synthesis and Natural Genesis (Nauka, Novosibirsk, 1988) [in Russian]; A. J. Gaskin and P. J. Darragh, U.S. Pat. No. 3,497,367 (1970); and E. G. Acker and M. E. Winyall, U.S. Pat. No. 4,049,781 (1977) which are incorporated herein by reference. Because of low synthesis cost, the $SiO_2$ spheres are preferably formed by a sodium silicate route, such as described by A. J. Gaskin and P. J. Darragh (U.S. Pat. No. 3,497,367 (1970)) and by E. G. Acker and M. E. Winyall (U.S. Pat. No. 4,049,781 (1977)). Spheres made by this process are commercially available from Nissan Chemical Company (Nissan Chemical America Corporation, Houston Branch, 12330 Bay Area Bvd., Pasadena, Tex. 77507). Alternately, the $SiO_2$ spheres can be made by the Stober method (A. K. Van Helden, J. W. Kansen, and A. Vrij, J. Colloid Interface Science 81, 354 (1981)), which results in more monodispersed silica spheres than does the sodium silicate route. Since the sodium silicate process results in spheres that are polydispersed in sphere diameter, they must be fractionated according to size by repeated sedimentation/redispersion, as described by A. J. Gaskin and P. J. Darragh (U.S. Pat. No. 3,497,367 (1970)). The growth of $SiO_2$ opals can be conveniently accomplished by slow crystallization of the monodispersed aqueous colloid by sedimentation at ambient (for example, over a 10 month period in a meter-long glass cylinder), or by faster methods described by J. Gaskin and P. J. Darragh (U.S. Pat. No. 3,497,367 (1970)).

Post-crystallization sintering may be by thermal annealing, first at 100–120° C. for several days, followed by high temperature annealing (for typically several hours at 750–800° C.) to produce a D/d of about 1.035–1.055. Mechanical strength measurements indicated when the sintering is sufficient for the development of the required inter-sphere interfaces. Typical resulting mechanical properties in compression for polycrystalline centimeter-size cubes of sintered 250 nm diameter opals spheres are a modulus of 24 GPa, an ultimate strength of 107 MPa, and a failure strain of 0.8%. The absence of over sintering (leading to void interconnect closure) may be insured by observing the transformation from the initial chalk-like appearance to a transparent, opalescent appearance when the opal is submersed in a liquid having about the same refractive index as the $SiO_2$ spheres.

The most preferred structure for the primary opal template is face-centered arrangement of monodispersed spheres. Such preferred structures usually contain stacking faults in which hexagonal interlayer packing is admixed with cubic interlayer stacking. Other preferred structures for the primary opal template are hexagonal-close-packed arrangements of monodispersed spheres, body-centered-cubic arrangements of monodispersed spheres, crystalline structures comprising mixtures of rods and spheres having monodispersed diameters, and crystalline arrangements of two or more sphere types. In the latter category, cubic structures comprising two monodispersed sphere types N and M are more preferred (where N are the smaller radius spheres and M are the larger radius spheres). Such structures of the $MN_{13}$ and the $MN_2$ type are most preferred. The $MN_3$ structure consists of twelve small spheres arranged icosahedrally around a larger sphere, while the $MN_2$ structure consists of a close-packed-layers of the large spheres stacked directly above each other, and the smaller spheres located interstitially. Methods for the preparation of these arrangements of spheres are described by P. Barrlett et al. in J. Chem. Physics. 93, 1299 (1990) and in Phys. Rev. Lett. 68, 3801 (1992). These methods are analogous to those used for the crystallization of monodispersed spheres—the major difference being these phases result from the crystallization of a mixture of two different radius spheres (having a radius ratio of about 0.58). For certain applications it is preferred that cubic or hexagonal arrays, or mixtures thereof, are mechanically deformed before or after the infiltration of material B. The benefit of such mechanical deformation is that the void volume can be decreased for the uninfiltrated opal (and symmetry can be decreased for either infiltrated or uninfiltrated opals).

Unless otherwise indicated here the preferred range for the diameter of the spheres in the primary opal template is from about 20 nm to about 100 $\mu$m. However, for particular types of materials applications a smaller range of sphere diameters is preferred. This range is from about 20 nm to about 10 $\mu$m for thermoelectric or thermionic applications, from about 20 nm to about 0.1 $\mu$m for application as low dielectric constant layers, and from about 50 nm to about 1 $\mu$m for preferred colorants for the visible, infrared, and ultraviolet wavelengths.

The selection of the above materials (B, C, etc.) depends upon the application need. For example, these materials can include optical materials (such as diamond), superconductors, redox materials (such as conducting organic polymers), piezoelectrics, metals, semiconductors, thermoelectrics, electrostrictive materials, magnetoresistive, and ferromagnetic materials. More specific guidance on the selection of these compositions will be provided latter, after we discuss the applications needs for the structures made by invention embodiments. Materials that provide a self-assembling microstructure, such as block copolymers and liquid crystal compositions, are also preferred—since these materials can form useful sub-structures within the opals and opal replicas. Examples of suitable block copolymer compositions are provided by S. Forster and M. Antonietti in Advanced Materials 10, 195 (1998). Particularly preferred examples are diblock and triblock polymers involving linkages of either polystyrene, polybutadiene, polyisoprene, poly(methylacrylate), poly(propylene oxide), poly(dimethylsiloxane), or polyethylene oxide.

Each of the templating process can be either a surface templating process (by coating only a layer on the interior surface of the opals) or a volume templating process (by completely filling the void volume of the opals). Various methods can be used to obtain infiltration, such as melt or solution infiltration, chemical vapor deposition (CVD) (including variants thereof like plasma-enhanced CVD), gas phase condensation, electrochemical deposition, and reaction of an infiltrated fluid. In electrochemical infiltration it is preferable to attach the electrochemical electrode to one side of an electrically insulating opal, and to permit the electrolyte to penetrate from the opposite side, so that the electro-deposited material grows from the electrode coated side of the opal to the opposite side. As examples of these processes, the deposition of a conducting polymer into the void volume of a porous opal is preferably by polymerization from a solution of the corresponding monomer and a suitable oxidant, by electrochemical polymerization, by vapor phase infiltration (involving de-polymerization and re-polymerization), by melt phase infiltration, or by deposition from a solution of the conducting polymer.

In a most preferred process for volume templating, the material to be infiltrated is melted and then either wicked into the opal or forced into the opal by an applied pressure. In other most preferred processes for volume templating, infiltration is by either CVD or gas phase condensation. Volumetric infiltration of solids by electrochemical processes, by in-situ reaction processes, and by chemical vapor deposition are preferred or most preferred only in special cases where the blockage of exterior channels before the complete filling of interior channels can be insured. This is the case when an infiltrated chemical either (a) reacts to form the nearly same volume of a desired solid or (b) this reaction proceeds from the inside to the exterior of the infiltrated sample in a bath of the infiltration fluid. This can also be the case where a temperature or chemical gradient preferentially causes progressive and essentially complete reaction from interior void space to exterior void space. Likewise, uniform filling of an opal sheet (or inverse opal plate) by electrochemical reaction is most effectively accomplished by choosing the opal or inverse opal sample to be made of an insulating material, which is intimately connected on one plate side by a conductor electrode. Examples of such suitable materials are insulating inorganic glasses, ceramics, and polymers.

In two most preferred processes for surface templating, the surface templating is by either the reaction of an infiltrated liquid (such as the polymerization of polyaniline) or the deposition from an infiltrated liquid (such as by the evaporation of a solvent from an infiltrated polymer solution). CVD and gas phase condensation are other most preferred processes for surface templating, since an initial surface templating process can become a volume templating process when reaction times are increased, and this transition from surface templating to volume templating can be prevented by keeping reaction times short. These surface templating processes are preferably accomplished as uniformly as possible by avoiding enhanced reaction at surfaces (that results in the clogging of the pore volume of the opal). For example, if a CVD deposition (or other chemical reaction) is by the reaction of two gaseous species (or liquid phase species), such clogging of the pore volume can be accomplished for a flat opal sheet by introducing these two species from opposite sides of the sheet.

Other templating processes of this invention are referred to a patch templating and as particle loading. Patch templating is a type of templating process where the surfaces of a void structure are covered with a partial surface coating of the infiltrated material (so that uncoated regions exist). Depending upon the application need this patch coating can be either percolated (called percolated patch) or unpercolated (called unpercolated patch). Patch coating is most preferably accomplished by inhomogeneous reaction from a solution, such as in the deposition of a metal from a metal salt (like the deposition of Au from a solution of $AuCl_4$). Adjusting the reaction time can control whether or not the patch coating is percolated, since an unpercolated patch coating can become percolated upon further reaction. Particle templating most preferably results from either the infiltration of particles into the opal (or the in-situ formation of such particles within said opal). The particles in particle-infiltrated opals are preferably aggregated together to form a mechanically robust structure, thereby insuring that these particle do not de-aggregate during extraction processes for the host matrix. For example, this aggregation can be accomplished by post infiltration sintering. Infiltrated particles are preferably smaller than $\frac{1}{5}$th the diameter of the smallest interconnections between void space in the infiltrated opal. Ultrasonic dispersion can be conveniently used to obtain particle infiltration from a colloidal dispersion. Alternately, or in conjunction with ultrasonically assisted infiltration, particle infiltration can be accomplished by passing a fluid containing the particles through a plate of the opal.

The void space in the face-centered-cubic opal structure is from about 19 to about 25% for the sintered opals that are most preferred for the invention embodiments. This means that the void space for a fully volume-templated opal will be about 25% or less. On the other hand, inverse opals obtained by surface templating can have much higher void volumes. Void volumes from about 75% to nearly about 100% can be conveniently obtained using the processes of the present invention.

Three-dimensionally periodic structures of this invention can be divided into two categories: hierarchical crystals and non-hierarchical crystals. For example, a diamond inverse opal is a hierarchical crystal, since the cubic diamond structure on the atomic scale is unrelated to the cubic lattice structure at optical wavelengths. On the other hand, one may use the processes of this invention to fabricate a form of graphite that is non-hierarchical (like a conventional crystal phase)—since it predominantly consists of graphite sheets whose local orientation and position crystallographically depends on an opal-derived periodicity (which is a thousand times longer than the graphite inter-layer separation).

Figure 2:
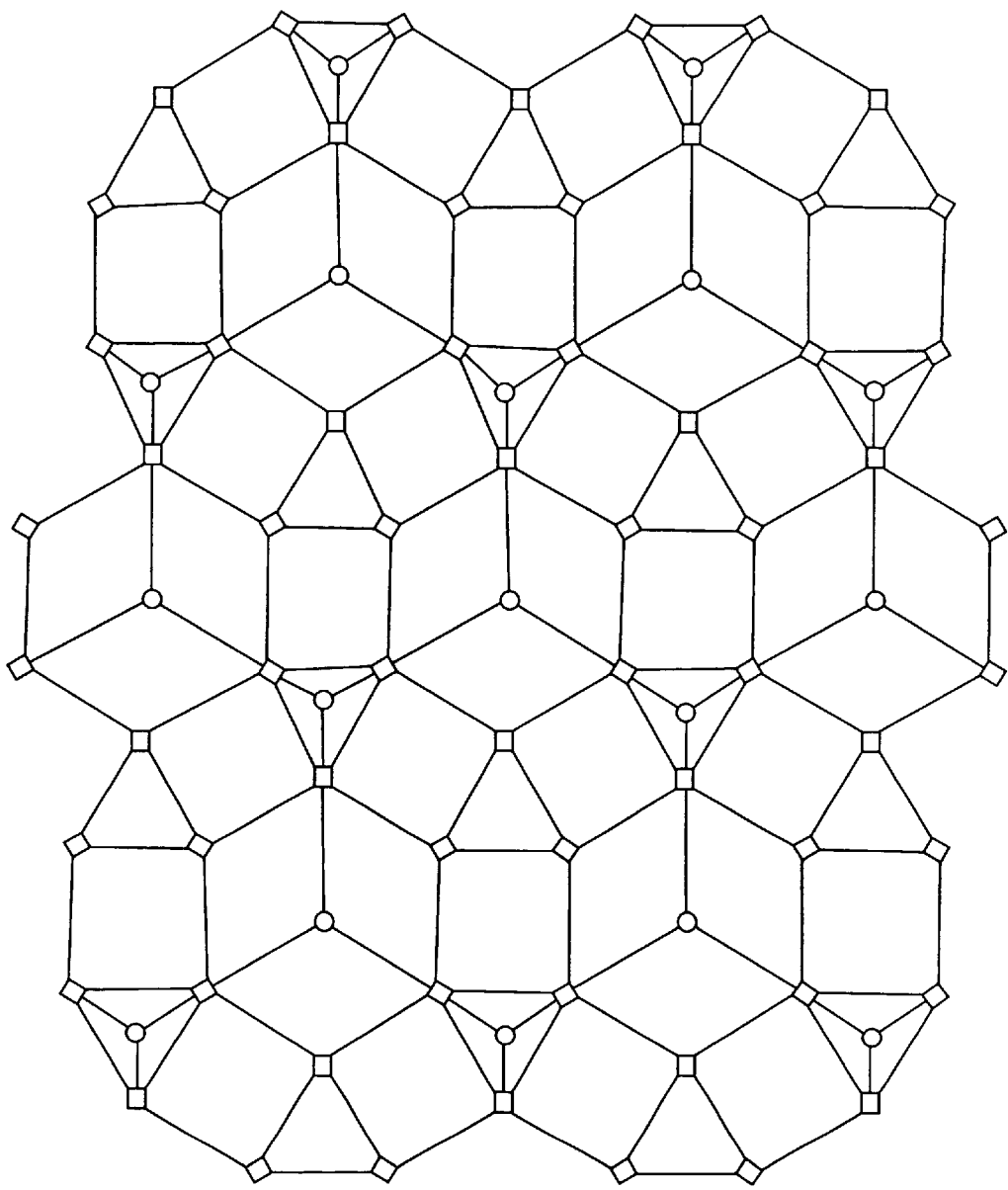
FIG. 2 is a schematic representation of the interconnected network of octahedral and tetrahedral motifs that are filled by the infiltration of the material B (which is an intermediate step in the formation of a volumetrically-templated inverse opal). The gaps between these motifs in this figure are filled by the initial infiltration process, but can be opened by the low-pressure melting/resolidification process demonstrated in invention embodiments.

Depending upon the surface energy of an infiltrated fluid (such as an infiltrated melt or liquid) and the dimensions of the interconnections between void space, it is sometimes necessary to apply pressure for infiltration in the opal or inverse opal structures. High pressure is required for metal infiltration into the $SiO_2$ opals because of the absence of significant wetting of the opal internal surface by the liquid metal phase. The lowest external pressure ($P_{ext}$) required for infiltration can be calculated using the equation $$P_{ext} = (2\sigma_s \cos\Theta)/r, \qquad (1)$$

where r is the capillary radius, $\sigma_s$ is the surface tension of metal phase, and $\Theta$ is the contact angle between two surfaces ($\cos\Theta=1$ for the non-wetting case). Thus, the smaller the minimum radius of the interconnects between nearest octahedral and tetrahedral voids (shown schematically in FIG. 2), the higher the pressure $P_{ext}$ that must be applied for infiltration. The capillary radius depends on the diameter of the spheres and the degree of sintering. The minimum radius of the channel between octahedral and tetrahedral voids can be calculated using the equation:

$$r_{min} = (3)^{-1/2} d - (D/2), \qquad (2)$$

where d is an effective distance between silica spheres and D is their initial diameter. Complete isolation of the tetrahedral and octahedral voids from each other occurs when the critical value of $D/d=1.155$ is reached. In this case, melt infiltration into the opal matrix is impossible. Using a typical value of $D/d=1.055$, a sphere diameter of 220 nm, and the surface tension of bismuth, the minimum pressure required for infiltration of molten bismuth (calculated using Eqns. 1 and 2) is about 0.7 kbar. The pressure that we use in order to obtain bismuth infiltration into large samples of $SiO_2$ opal ($6 \times 6 \times 6$ $mm^3$) in a reasonably short time is much higher (8–10 kbar at 300–350° C. for 1–2 hours).

It has been discovered (by scanning electron microscopic observations, differential scanning calorimetry measurements, and observation of dramatic changes in conductivity) that remelting and resolidification (at ambient or low pressure) provides a method for engineering periodic arrays of breaks of 10 nm or smaller dimensions inside the materials that had been melt-infiltrated at high pressures (where such breaks do not exist). For the practice of this invention embodiment of opening up nanoscale gaps in infiltrated materials, it is preferred that the infiltrated material has both a lower melting point than the confining host lattice and a positive volume expansion upon melting. Also, it is preferred that the initial melt phase infiltration (and resolidification) is conducted at a much higher pressure that the subsequent melting and resolidification step. More preferably, this infiltration pressure is at least about 0.1 kbar. Finally, it is preferred that the period of time that the infiltrated material is held in the molten state prior to solidification (at low pressure) is keep as short a time as convenient, since essentially complete de-infiltration of the infiltrated material can occur (in some instances) if this period is too long. The infiltrated material is preferably held in the molten state after remelting for no more than about 10 minutes. For those material that easily de-infiltrate from the opal during low-pressure melting and resolidification, one can optionally apply pressure during this process to prevent massive de-infiltration (which is preferably much smaller than the pressure used for the initial infiltration. It is believed that the origin of the observed effect is the positive volume expansion coefficient of the infiltrated material, which results in about a few percent extrusion of the infiltrated material during the low-pressure melting step. Upon recrystallization, there is not sufficient volume of infiltrated material to fill the void space of the opal (since a few percent of the initially infiltrated material has been extruded). As a result, voids open up in the recrystallized infiltrated structure (six voids per original sphere in the primary opal template), so as to minimize the unfavorable interfacial energy between the infiltrated material and the spheres of the opal structure. This means that for an opal structure (based on 200 nm diameter spheres, which contains about $10^{14}$ spheres/$cm^3$) a periodic array of very small gaps is created (down to a diameter of less than 10 nm) and extremely high density (about $6 \times 10^{14}$ gaps/$cm^3$). As will be described latter, such ability to engineer nanoscale gaps is very important for device applications, such as thermionic materials. This process of nano-gap engineering is useful for a variety of materials, such as Sn, Pb, and Te-infiltrated $SiO_2$ opals Evidence that such process is occurring is provided by Differential Scanning Calorimetry, DSC (which shows that the octahedral and tetrahedral void sites of the original opal lattice remain occupied after melting and subsequent resolidification), visual observation of a limited amount of materials extrusion from the opal during low pressure melting, and the occurrence of a transition from metallic conductivity to extremely low room-temperature conductivity as a result this melting and resolidification process for infiltrated metals (indicating that the metal within the opal is no longer percolated).

Chemical reaction, melt phase de-infiltration, solution extraction, super-critical fluid extraction, and electrochemical dissolution are most preferred methods for the extraction processes of this invention. Which method is utilized depends naturally upon the nature of the material being extracted and the material that should be unaffected by such extraction processes. The choice of the most suitable extraction process is conveniently determined by using the known characteristics of the materials in question, or by experiments that measure the rate at which components of opal derived structures are removed by particular chemicals. For example, the $SiO_2$ spheres of the $SiO_2$ opals can be extracted (or, if desired, partially extracted) by using either an acid (such as aqueous HF) or a base (such as alcoholic, aqueous or non-aqueous sodium hydroxide or potassium hydroxide). Such extraction can be either at ambient or lower temperatures, or at elevated temperatures to accelerate the extraction process. Such extraction processes can be accomplished at various steps in the creation of complex three-dimensionally periodic structures. For example, it has been found that extraction with aqueous KOH can be used to modify the structure of the original opal in novel and useful ways. Limited exposure to the base preferentially etches the sphere regions that are removed from the inter-connect region for sintered $SiO_2$ opal—resulting in a template structure with an enhanced void volume, and dumb-bell-like interconnections between neighboring spheres. Such a structure with rod-like struts between spheres has been unsuccessfully sought for the purpose of making photonic bandgap crystals. Most preferably, the removal of the material A is by treatment with either an acid, a base, or a solvating or reacting chemical at a temperature of below 200° C. Other less preferred methods can also be used for the extraction processes (or partial extraction processes), such as gas phase removal by sublimation, thermal degradation, and plasma reaction.

Surface-templated inverse opals of this invention are particularly useful for the fabrication of complicated structures comprised of potentially numerous components that are separately percolated to form continuous structures, as described below in more detail. These approaches can utilize the existence of two separately percolated void volumes, which can be separately filled and separately electrically addressed. These void volumes correspond to (1) the space left by the extraction of the A spheres of the primary opal template (called $S_1$) and (2) the space exterior to both this volume and the material B (called $S_2$, which is the unfilled portion of the original void volume of the primary opal template). For example, described herein are processes for making a redox display, supercapacitor, or battery using a surface-templated inverse opal. Using the processes of the invention one first makes a plate of surface-templated inverse from a material B that is a solid-state electrolyte (which is an ionic conductor and an electrical insulator). The opposite sides of this plate are referred to as the left and right sides. The electrically and ionically conducting redox materials (such as conducting polymers) that will be filled into this inverse opal are called $C_1$ and $C_2$. Although the basic nature of the following process does not depend upon this assumption, for simplicity it is assumed that $C_1$ and $C_2$ infiltrate (for example, from a fluid phase) more quickly into $S_1$ than $S_2$. The process is then as follows:

(a) Infiltrate $C_1$ from the left side of the plate, thereby initially filling both $S_1$ and $S_2$ void spaces, and then (for further distances from the diffusion surface) only filling the $S_1$ void space. Infiltration of the $S_1$ void space is terminated immediately before this infiltration reaches the right-hand side of the plate.

(b) The left side of the plate is etched away to the point that only the $S_1$ void space has been filled.

(c) The terminal ends of the infiltrated $C_1$ material (on the left-hand surface of the plate) are reacted so that they are permanently converted to being an insulator.

(d) Infiltrate $C_2$ from the left side of the plate, allowing the infiltration to proceed across the entire void space through $S_2$ (since the left-hand ends of the $S_1$ void space are already filled, this infiltration step does not effect that $S_1$ void space). Allow the $C_2$ material to coat the left-hand side of the plate, thereby providing an easily contacted electrode surface that is connected to all the $C_2$ material.

(e) The terminal ends of the infiltrated $C_2$ material (on the right hand surface of the plate) are reacted so that they are permanently converted to being an insulator.

(f) Infiltrate $C_1$ from the right side of the plate, allowing the infiltration to proceed across the entire void space through $S_1$ (since the left-hand ends of the $S_2$ void space are already filled, this infiltration step does not effect that $S_2$ void space). Allow the infiltrated $C_1$ material to coat the right hand side of the plate, thereby providing an easily contacted electrode surface that is connected to all the $C_1$ material.

The consequence of this process, for which numerous variations are obvious from this teaching, is the formation of a redox display material, a supercapacitor, or a battery. If the original opal-derived structure was based on 250 nm spheres, and if the electrolyte coating was 40 Å thick, such a redox device would comprise about $10^{14}/cm^3$ of in-parallel redox devices that provide ultra-fast redox response because of the extremely high inter-electrode surface area and the nanoscale inter-electrode separation. The following examples section experimentally demonstrates how to make surface-templated inverse opals having these nanoscale-dimensions. Preferred materials made by this method, and by other related methods can be described as a three-dimensionally periodic material comprising at least three spatially separate compositions, wherein the interfaces between these compositions are replicas of the surfaces of a sphere array, wherein the sphere diameter is from about 20 nm to about 100 $\mu$m.

The processes of this invention may be used to synthesize novel and useful forms of carbon having lattice parameter that are giant, so Bragg diffraction occurs at optical wavelengths and results in an opalescent appearance invention (Examples 5–8 and 10). Materials with such large long periodicities (and significant refractive index fluctuations on the scale of these periodicities) are called photonic crystals. Like the shift from the dimensional scale and topologies of ordinary diamond and graphite to those of the fullerenes, this further expansion to optical wavelengths can provide new properties, such as a metallic photonic bandgap. The formation of carbon photonic crystals uses a templating step in which either carbon or a carbon precursor is infiltrated into porous silica opal crystals. The silica crystals are sintered prior to this infiltration, producing an extended interface between nearest-neighbor spheres. This interface δ (shown in FIGS. 8 and 9) enables a final process, which is the extraction of the $SiO_2$ (using, for example, aqueous HF or aqueous or alcoholic KOH). The resulting product is a carbon photonic crystal, which is called a carbon inverse opal (since the void space of the primary opal template is the only occupied space). Heretofore no one has been able to make either carbon phases or insulator-free metals that are three-dimensionally periodic on the scale of optical wavelengths.

The carbon infiltration inside the opal (either by CVD, plasma enhanced CDV, or by the infiltration of a precursor) either largely or completely fills the void volume of the porous silica opal, thereby resulting (after silica extraction) in either a volumetric inverse opal or a surface inverse opal. The provided examples show the application of each of these methods. In addition, there is a vast literature that describes suitable precursors, temperatures, and times that can be used for the formation of carbon phases. Some typical examples of suitable compositions for CVD or plasma enhanced CVD are aromatics like benzene and anthracene and alkanes like methane and ethane. Depending upon whether the desired carbon product is graphitic or amorphous carbon, different precursors can be chosen for infiltration, and subsequent pyrolysis. For example, furfuryl alcohol reacts to form a resin that does not readily graphitize. On the other hand, aromatic compositions such as poly(phenylene) readily graphitize. Both volumetric inverse opals surface inverse opals of carbon phases provide an assembly of interconnected tetrahedrally and octahedrally shaped motifs (with eight tetrahedrons and four octahedrons in the cubic unit cell), that are replicas of the void space in the opals. These motifs are solid for an ideal volumetric inverse opal, so the carbon phase comprise a single labyrinth. On the other hand, these motifs are hollow for the surface inverse opals, so there can be two separate three-dimensional labyrinths (one internal to the octahedral and tetrahedral motifs, called $S_1$, and the other external, called $S_2$, as described above).

Figure 3:
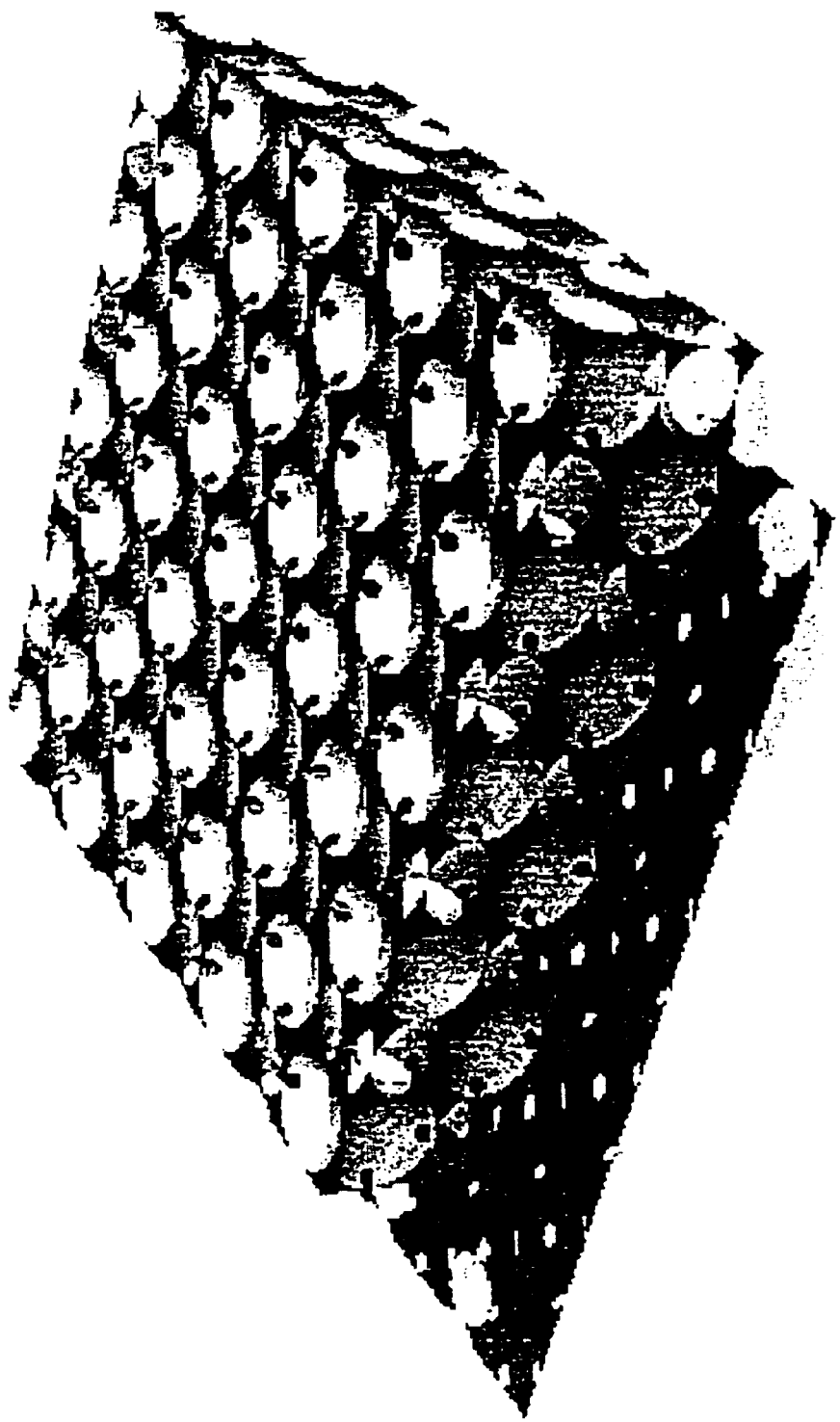
FIG. 3 is a structural model for a volumetrically-templated inverse opal produced from a face-centered-cubic opal. The large holes in the structure correspond to sphere locations in the original sphere array of a porous opal.

The fabrication of glassy carbon inverse opals uses another embodiment of the present invention, involving the infiltration of a carbon precursor into the opal (and the subsequent polymerization and carbonization of this precursor). This may be accomplished by infiltrating millimeter-thick silica opal plates with an organic resin (such as a phenolic or furfuryl alcohol based resin), thermally curing this resin at low temperatures, cutting the opal from the resin, removing residual surface phenolic by oxygen plasma etching, dissolving the $SiO_2$ from the resin infiltrated opal using aqueous HF, and pyrolizing the resulting resin inverse opal at progressively increased temperatures of up to about 1000° C. or higher (Example 6). Scanning electron micrographs of fracture surfaces show a highly periodic structure throughout the volume of both the phenolic and glassy carbon inverse opals. The void structure comprises a face-centered-cubic arrangement of spherical voids, which are each interconnected with twelve neighboring spherical voids through interconnects which can be as small as a few hundred angstroms in diameter. As expected for a photonic crystal with a large void volume, the phenolic and the glassy carbon inverse opals are intensely opalescent. This opalescence shifts from predominately red in the $SiO_2$ opal (based on 300 nm spheres) to predominately green in the phenolic inverse opal, and to dark blue/violet in the final carbon inverse opal (partly reflecting a 20% or higher contraction in unit cell dimension upon the pyrolysis of the phenolic inverse opal). If the pyrolysis step occurs before the extraction of the $SiO_2$ spheres, the periodic wall structure of the glassy carbon inverse opal become porous (due to the volume change associated with pyrolysis), as shown in FIG. 3.

Figure 6:
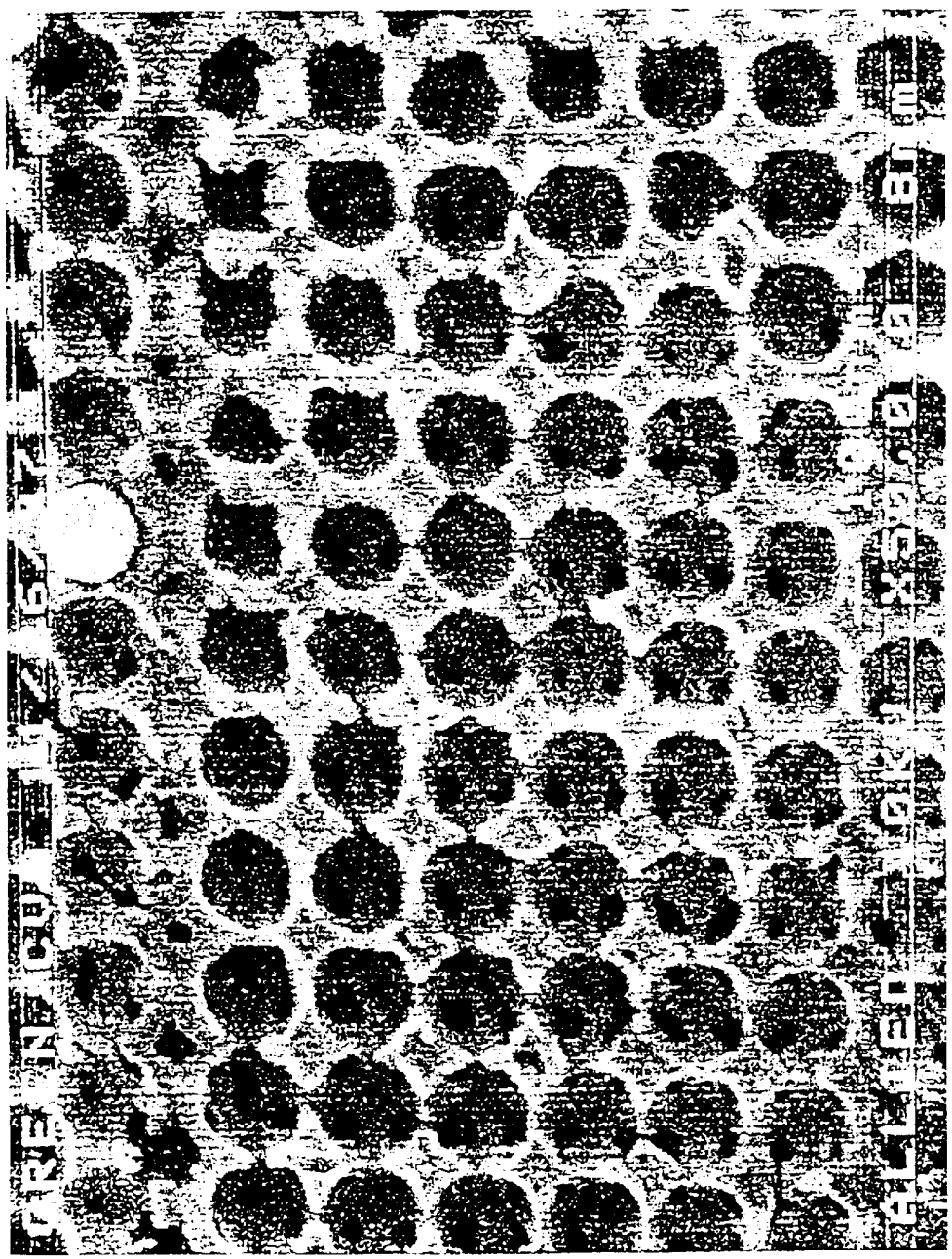
FIG. 6 is a scanning electron micrograph of a (100) plane of a graphite inverse opal made by the CVD process embodiment of Example 10. The white sphere in the upper part of the pictured fracture surface is a $SiO_2$ sphere which was not extracted by the hydrofluoric acid treatment (probably because this sphere was not correctly connected by inter-sphere necks to neighboring spheres—so the acid had no access to this sphere).

In another invention embodiment, carbon infiltration by chemical vapor deposition (CVD) is done to make graphitic inverse opals. Carbon infiltration into millimeter thick, and approximately 1–2 cm by 2–4 cm slabs of porous $SiO_2$ opal is accomplished using a 1:3 molar ratio of propylene and $N_2$ as the feed gas (one atmosphere for 6 hours at 800° C.), which is further described in Example 10. This procedure is followed by silica removal using aqueous HF. This CVD-produced carbon inverse opal is opalescent and highly periodic and structurally regular down to the 10 nm scale (as shown in FIG. 6). While x-ray diffraction measurements indicate that the phenolic-derived carbon inverse opal is a glassy carbon, diffraction and $C^{13}$ magic angle spinning spectra indicate that the CVD-produced inverse opal is graphitic. Both the CVD and phenolic processes produced carbon inverse opals that are highly conducting, providing a four-point-probe electrical conductivity of about 10 S/cm.

In another invention embodiment (described in Example 13), plasma-enhanced CVD has been used to make diamond inverse opals (shown at FIG. 7), as well as another type of carbon photonic crystal that is non-hierarchical. Millimeter thick opal plates were seeded with 5 nm diamond particles (which serve as nuclei for diamond growth) using ultrasonication of a suspension of 5 nm diamond grit in acetone in an ultrasonic bath for 15 minutes. Carbon was subsequently deposited inside the opal plates from a hydrogen/methane plasma created in a standard reactor by microwave excitation. Extraction of the $SiO_2$ spheres from the carbon infiltrated opal (using aqueous HF) resulted in a material whose structure depends upon the proximity to the exterior surface of the original opal plate. About a 60 μm thick layer of cubic diamond (containing micron size crystallites with typical diamond crystal morphology) exists on the exterior surface of the opal that was closest to the plasma. The carbon inverse opal closest to this surface is a 30 μm thick layer arising from essentially complete filling of the porous opal with ordinary cubic diamond (identified by the electron diffraction pattern and a strong line at 1332 cm$^{-1}$ in the micro-Raman spectra). While poor adhesion is typically a problem in diamond coating technology, the exterior diamond layer is intimately connected to the diamond inverse opal. Scanning electron micrographs show that the lattice of interconnected octahedral and tetrahedral voids of the starting opal is replicated in the structure of the diamond inverse opal (see FIG. 7). The 300–500 μm thick layer immediately below the diamond inverse opal is a volumetric inverse opal (or a heavily filled surface inverse opal) consisting of graphitic carbon, which tends to separate from the diamond inverse opal layer during $SiO_2$ extraction. The innermost layer in the carbon deposited by the above described method (and Example 13) is composed of a new type of carbon phase (shown in FIG. 10), which we call a cubic graphite phase. In contrast with the case for the carbon photonic crystals that we have previously described, the atomic arrangement of graphite sheets is determined by the cubic structure existing at optical wavelengths. Hence the name cubic graphite. Like proposed carbon phases called schwarzites, which were originally based on the tiling of triply periodic minimal surfaces with sheets of $sp^2$ carbons [see. A. L. Mackay and H. Terrones, *Nature* 352, 762 (1991)], the cubic graphite phase arises from tiling of the interior surface of the opal. However, unlike the proposed schwarzites, the cubic graphite phase comprises graphitic sheets that are tiled upon each other— reminiscent of the structure of carbon onions (which are carbon particles consisting of concentric graphitic shells). The number of such layers depends upon deposition conditions and generally decreases with increasing separation from the infiltration surface (within 200 µm thick sheets of surface inverse opal). However, a 40 Å layer thickness is typical for the innermost structure, and is used for discussions. The void structure of the original opal is precisely replicated in the carbon phase indicating that these 40 Å thick stacks are sufficiently strong to survive the stresses generated during the dissolution of the $SiO_2$ spheres (see FIG. 10 and Example 13). An electron diffraction pattern from cubic graphite provides diffraction spacings close to that of ordinary graphite: 3.43 Å for (002), 2.10 Å for (100), 1.72 Å for (004), and 1.23 Å for (110). As expected because of the nested type of structure, the absence of reflections other than (hk0) or (001) indicates that the carbon layers are not in lateral registry. Covalent bonding between hollow spheres is indicated by the fracture mechanism of this and our other carbon inverse opals—fracture occurs across the sphere centers, rather than across intersphere necks. This is like the usual fracture mechanism of gem quality natural opal (but opposite to that of the sintered porous opals).

In an idealized model for the cubic graphite phase, each graphite sheet extends throughout the entire lattice and is everywhere parallel to the void surface left by the dissolved $SiO_2$ spheres. Although structural defects modify this simplistic representation, the alignment of arrays of graphite sheets parallel to this void surface is evident from transmission electron micrographs. Ignoring the channels to neighboring spheres (typically), the $SP^2$ carbon tiled spheres in the carbon phase are similar to a nested arrangement of giant fullerene spheres. Each layer of a nested stack in 250 nm spheres having 60 nm diameter inter-sphere channels contains about six million carbons. Consequently, the unit cell (which has the same Fm-3m space group and lattice parameter as the original opal) contains about three hundred million carbon atoms in a nested 40 Å thick stack. No previously known process can be employed to make a crystal structure (in which atomic positions are strongly correlated with the lattice periodicity) that contains so many atoms.

The applications for these three-dimensionally periodic materials result from this periodicity. One category of applications exploits three-dimensional structural periodicities that are in the visible, infrared, or ultraviolet regions to make optical switches, display devices, and directional light sources. In each case the periodicity-dependent property being exploited is the Bragg scattering of the electromagnetic radiation. This control on the direction of propagation of light (of a specified frequency) results from a change of the diffraction angle of this light because of a change in the unit cell parameter of the opal derived structure. This change in unit cell parameter can be conveniently accomplished by any of the various well-known methods that result in a change of materials dimension. Examples are the application of an electric field for an electrostrictive or piezoelectric material; a temperature or pressure change for either an ordinary material or a shape memory material; exposure to a solvent that causes swelling; the electrically-induced change in dimensions of a gel polymer; a thermally-induced chemically-induced, or photo-induced reaction of a reactive matrix material; and an electrochemically-induced dimensional change of a redox material (like carbon or a conducting polymer). Depending upon the choice of materials and operating conditions, these changes can be either reversible or irreversible, and can include the effects of refractive index change. The inverse opals synthesized by the present processes are ideal for such optical switch applications, since the diffraction efficiency of an array of particle array is enhanced if the low refractive index phase occupies a much larger volume fraction than the high refractive index phase. For a close-packed array of spherical particles (as in the porous $SiO_2$ opals), the maximum volume (about 76%) is occupied by the particles—so diffraction efficiency is not optimized if the void space is air filled. However, in inverse opals made by the processes of this invention, an infiltrated material has filled the void space and the spherical particles (such as $SiO_2$) have been extracted (leaving air spheres). Hence, the low refractive index phase (i.e., the air phase) is now the majority phase, which is the situation that maximizes diffraction efficiency.

There are important applications for the three-dimensionally periodic structures of this invention for electro-optical displays and switches. For example, in one invention embodiment flat plates of an inverse opal may be made from an elastomeric material that is electrostrictive and opalescent. In Example 9 there is demonstrated the formation of a direct opal of such an elastomeric material, by the reaction of a silicone elastomer inside a polystyrene inverse opal, followed by dissolving the polystyrene. As an alternative, an elastomeric polymer can be infiltrated into an opal (such as a $SiO_2$ opal) from either a melt or a solution (or reactively formed with the opal), and the original opal template can then be removed (such as by exposure to aqueous HF for the case of the $SiO_2$ opal). If transparent non-constraining electrodes are deposited on opposite sides of the flat plates and an electrical voltage is applied, the material will shrink, so as to minimize total energy. This electrically-induced shrinkage causes a color change because of a shift in the Bragg diffraction of the inverse opal. This color change is a new type of electrochromism that can be used for various types of displays. Various methods can be used to enhance performance for this invention embodiment. For example, the elastomeric inverse opal can be fluid filled (so as to increase dielectric breakdown strength) and the opal can be cut as single crystal sheet (so as to result in uniformity of the color change obtained for a particular viewing angle). This new electrochromic effect can be combined with conventional technology for displays, so as to provide different colors from different pixels and viewing-angle-independent coloration.

Materials made by the processes of this invention are particularly useful as colorants for polymer article. With one exception, these novel colorants can be co-mingled with conventional plastics by the same well-known methods used for co-mingling conventional colorants with plastics. This exception is that the commingling process should not be so severe that small particle size and/or the destruction of lattice periodicity adversely effect the coloration (by severe plastic deformation). For this reason, it is preferred that the overall particle size (corresponding to the crystal size if the particles are single crystals) exceeds at least 30 µm in at least one dimension. In contrast with ordinary colorants, these colorants provide color through diffraction effects, rather than electronic absorption. Hence, these colorants can have extremely high stability to photodegradation and chemical degradation effects that fade conventional colorants. It is preferable that these colorants for polymers have a temperature of melting or flow point that is in excess of the processing temperature employed for processing the matrix polymer and below the temperatures that result in substantial degradation of the matrix polymer. The reason for this preference is that such combinations of opal-derived colorant and matrix polymer provide the basis for an environmentally friendly method for achieving polymer coloration. Polymers are melt processes at a temperature where the colorant is stable (since it neither melts nor flows). Later, during polymer recycling, the polymer may be reclaimed as a colorless material by using processing temperature that result in melting or flow of the colorant materials, so as to destroy the periodicity that is the origin of the coloration effect.

It has been observed that elastomeric materials (such as polyurethane and silicone rubbers) made by the invention embodiments change color when stretched. This effect arises because of the change in Bragg diffraction angle for a particular wavelength of light caused by the mechanically-induced change in lattice parameters and refractive index. This unusual piezochromism is of practical importance both for the providing an attractive cosmetic function to ordinary rubbers. This piezochromism can be used to provide a simple stress or strain sensors, which operate either because of a change in color or a change in optical pathlength caused by the elastic distortions of the rubber lattice. This piezochromism is also useful for both optical switches and optical displays, since conventional piezoelectric or electrostrictive materials can be used to cause a color change or to deflect a light beam in an optical switch. The piezoelectric materials and electrostrictive that are preferred for electro-mechanically driving are those providing at least a 1% change in dimension in response to an applied voltage. Examples of such preferred materials are elastomeric rubbers and single crystal ferroelectrics known in the art. This dimensional change can be optionally amplified by mechanical methods (such as by using various cantilever-based methods well known in the art, like inch-worm, cymbal, moonie, and bimorph arrangements). It is more preferable that the piezoelectric or electrostrictive materials (used for electro-mechanical driving of the opal-derived structures) provide at least a 5% change in length in response to an electric field. Particularly preferred compositions that provide such dimensional changes are elastomeric rubbers.

Changing the refractive index of materials infiltrated into the inverse opals of our invention embodiments results in dramatic color changes of the inverse opals. The angle-dependent color of these materials reflects a change in Bragg diffraction angle. This dependence of coloration on the refractive index of the infiltrated material (or the refractive index of the inverse opal) provides a second mechanism for the operation of an optical switch, or a chromatic display element (which is complementary to the above-described mechanism of changing lattice parameter). This is shown in the examples where we compare chromatic effects that we obtain for non-absorbing inverse opals (made from polystyrene and poly(methyl methacrylate)) with that for absorbing inverse opals (made from phenolic resin and carbon). For the purpose of a switchable display element, we have also shown that incorporating an absorbing material with switchable absorbency can be successfully utilized. While it has been long known that refractive index changes of materials infiltrated in ordinary direct opals can provide chroniism, the degree of such chromism is effected by the small filling factor of these materials (about 26 volume percent). In contrast, processes of the present invention provide void volumes from about 75% to nearly 100% for surface-templated inverse opals, and this void volume can be filled by infiltration. A void fraction of nearly 100% results for the cubic graphite phase of Example 13; a void volume fraction of about 74% results for the phenolic inverse opals of Example 1, the carbon inverse opals of Example 3, 6, and 7, the polystyrene inverse opal of Example 4, the poly(methyl methacrylate) inverse opal of Example 5, the epoxy inverse opal of Example 6, and the metal inverse opal of Example 17; and a void fraction of approximately 25% results for the elastomeric direct opal of Example 9. The correspondingly larger accessible infiltration volume for our inverse opals provides a dramatically enhances coloration change for a given change in refractive index of the infiltrated material. Depending upon the application mode, this refractive index change can be a result of irradiation (for a radiation sensor), pressure (for a pressure sensor), applied electric field (for an electro-optical switch or electrochromic display element), or other variable of interest (such as a gas concentration or a magnetic field).

Structures having very high surface areas can be made by the processes of this invention, which leads to other applications—such as the electrodes of batteries and supercapacitors, catalyst supports, gas sensors, and storage materials for gases such as methane and hydrogen. The surface areas of the initial opals is not high (if the opals are made of solid spheres) until very small sphere sizes are used, since either the gravimetric or volumetric surface area is inversely proportional to the lattice repeat length (and the sphere diameter). For example, opals based on 280 nm, 230 nm, and 190 nm diameter opals provide surface areas from mercury porosimetry measurements of 13.9, 18.5, and 25.8 $m^2/gm$, respectively. This surface area can be dramatically increased by going from a direct opal structure to an inverse opal structure, or by the activation of a material in an inverse opal to generate additional surface area. Even without activation, surface areas of 390 $m^2/gm$ (mercury porosimetry) can be obtained for inverse carbon opals (derived by a phenolic pyrolysis route/$SiO_2$ extraction route described in this invention) based on an original template of 280 nm $SiO_2$ spheres. Electrically conducting forms of carbon are the most preferred composition for inverse opals for this application. Because of the high conductivity of these carbons, and the high achievable surface areas, they are especially preferred were both the electrical conductivity and high surface area are important, such as electrodes for supercapacitors and high discharge rate batteries and as actuators based on the electrochemical double-layer effects (see R. H. Baughman in Synthetic Metals 78, 339 (1996) and B. K. Miremadi and K. Colbow, Sensors and Actuators B 46, 30 (1998) for methods for methods for using high surface area carbon in sensors and actuators).

Methods commonly employed for increasing the surface of ordinary forms of carbon (such as steam activation, carbon dioxide, and KOH activation) are also suitable for increasing the surface of carbon-based opals and inverse opals made by the processes of this invention. Such methods are described by D. F. Quinn and J. A. MacDonald in Carbon 30, 1097 (1992), by P. N. Aukett et al. in Carbon 30, 913 (1992), and by R. Y. Lin and J. Ecomomy in Applied Polymer Symposium, No. 21, 143 (1973). The preferred average pore diameter in these carbons for gas storage applications is between 4 Å and 10Å.

The extremely high surface areas and sharp structural features obtainable by the processes of this invention enable another important application, which is an electron emissive element for devices such as displays and thermionic coolers and energy conversion units. For such purposes materials having work functions lower than about 2 eV are most preferred. An opal-derived structure that is most preferred for this application is one that uses a cesium layer on a semiconductor, a low work function metal, a piezoelectric coating on a semiconductor, infiltration-deposited diamond doped diamond, wherein the shape and dimensional scale of these depositions replicates details of the original opal template structure. For details on the specific compositions and arrangements that have demonstrated utility for these applications (by lowering the surface barrier for electron emission) see Underwood et al. [Applied Physics Letters 73, 405 (1998) and references]. These same specific compositions and arrangements are those that are preferred for the present invention embodiments, where we take advantage of the unique structures provided by the inverse opals. These features include the ability to make nanoscale breaks in the opal-derived structures, as well as the resulting ability to create a two-dimensional array electron emitters having nanoscale sharpness for the enhancement of electric fields. For example, the prior art has made nanoscale arrays of diamond tips electron emitters by using lithographic methods. By the processes of this invention one may achieve arrays of diamond tips that are much less expensive to produce and much finer in structural detail. This is achieved by using a crystallographic plane of the diamond inverse opal as the emitter surface. A process for achieving such a structure is to crystallize a few monolayers of monodispersed $SiO_2$ spheres onto a conducting substrate, so that the most closely packed plane is parallel to the substrate. Methods for achieving such deposition have been described by A. van Blaaderen et al. (Nature 385, 321 (1997), as well as by earlier authors. Using the plasma-enhanced CVD process, diamond is deposited within the porous opal deposition. If necessary, any excess diamond on the opal surface is etched away, such as by using a hydrogen plasma. Subsequent etching of the $SiO_2$ spheres (such as with dilute HF or a strong base) will leave three pointed microelectrode elements surrounding each spherical hole on the surface, which corresponded to the original locations of a $SiO_2$ sphere. If the original filling of the porous opal layer is terminated when the filling reached the mid-point of the outermost layer of $SiO_2$ spheres, or if subsequent etching of the diamond occurs to this point, these diamond electrode pillars would have a point diameter which approaches zero as D/d of Eqn. 2 approaches 1.155. Carbon forms that are especially preferred for this application are diamond with hydrogenated surfaces, polycrystalline diamond (where $sp^2$ carbons at grain boundaries confer electrical conductivity), diamond-like carbon, and doped diamond (particularly nitrogen-doped carbon).

The use of the processes of the invention to make optical materials having photonic bandgaps is especially valuable, since photonic bandgaps materials are sought for applications because of a host of useful properties, such zero threshold lasing, and the ability to bend light at curvatures as small as the wavelength of light (for optical circuit and optical sensor applications). The inverse opals are also useful as a dielectric-based photonic bandgap material, especially since a large volume fraction of the low refractive index phase facilitates gap formation [See S. John, *Phys. Rev. Lett.* 58, 2486 (1987); S. John, *Physics Today* 44(5) 32 (1991); E. Yablonovitch, *Phys. Rev. Lett.* 58, 2059 (1987); and E. Yablonovitch and K. M. Leung, *Nature* 391, 667 (1998)]. In addition, the embodiments of the present process provide metallic inverse opals in which the combination of low filling factor and high in-plane conductivity (especially surface inverse opals, such as our described cubic graphite phase) can provide a plasmon-defined photonic bandgap in the infrared. Such a material (with a plasmon-defined photonic bandgap in the infrared) is of considerable technological interest, since prior-art limitations on the fabrication method have previously restricted such useful materials with metallic photonic bandgap to the microwave region [see D. F. Sievenpiper, M. E. Sickmiller, and E. Yablonovitch, Phys. Rev. Lett. 76, 2480 (1996) and J. Joannopoulos, R. Meade, and J. Winn, "Photonic Crystals" (Princeton Press, Princeton, N.J., 1995)].

The processes of this invention for obtaining three-dimensionally periodic structures by the templating and extraction processes for self-assembled opals also provide useful materials for chromatic separations. The reasons for this utility include (a) the existence of well-defined channels having accurately defined dimensions, (b) the ability to vary channel dimensions, and (c) the applicability of the present processes for making porous structures for virtually any material (including carbons that survive in inert atmosphere to far above 2000° C.).

The processes of the present invention can provide mechanically robust foams having extremely low densities, these processes are applicable for the formation of low dielectric constant layers for high-density electronic circuits. Surface-templated inverse opal structures are most preferred for this application, because of the low achievable density, which translates into a very low achievable dielectric constant. The methods of this invention can be used to introduce porosity in the internal surfaces of such inverse opals porous, thereby further reducing the dielectric constant. In a specially preferred embodiment, spherical particles are crystallized on the electronic substrate to form a porous layer, a foam-forming organosilane is infiltrated into the opal structure, and then polymerization (and carrier extraction) processes are conducted to create a foam within the interstitial space of the original porous opal. In this preferred process the opal particles must be removable by a solubilization or degradation process (such as hydrogen plasma etching of carbon spheres), which does not effect the foam formed by the organosilane. This extraction process is the final step in the formation of the low dielectric constant coating. In order to obtain a porous structure that does not have a structural non-uniformity on a scale that effects deposited circuit elements, it is preferable that the sphere diameter of the original opal does not exceed about 100 nm. It is more preferable that this sphere diameter does not exceed about 50 nm. In another preferred process, the methods of this invention produce an inverse opal of an easily removed material (such as an easily dissolved polymer, such as polystyrene). The surfaces (or entire void volume) of this inverse opal are coated with a foam, and the inverse opal template is then removed—thereby providing the low dielectric constant substrate material.

Since the processes of this invention provide materials having high interfacial area and periodic nanostructure, these processes are useful for the formation of nanostructured thermoelectrics. These nanostructured thermoelectrics are most preferably obtained by the infiltration of conventional thermoelectric materials (see section below) into opal, inverse opal and other opal-derived structures from a melt under pressure of 0.0–10.0 kbar at isostatic conditions or by chemical vapor deposition methods. The concept utilized here is that scattering processes at the interface between opal and infiltrated thermoelectric material increase the thermoelectric figure of merit (ZT) by having a greater effect on phonon-mediated (lattice) thermal conductivity than on electronic conductivity. This enhancement of ZT follows from such changes, since $ZT=S^2\sigma T/(K_l+K_e)$, where S is the Seebeck coefficient, $\sigma$ is the electrical conductivity, and $K_l$ and $K_e$ are the phonon and electronic components of thermal conductivity. This approach results in an increase of ZT for a prototype system: bismuth infiltrated into porous $SiO_2$ opal. A larger fractional decrease in thermal conductivity is found than for electrical conductivity (relative to bulk polycrystalline Bi). Since the thermopower is little changed, the overall effect observed is as much as a two-fold increase of ZT compared with that for polycrystalline bulk bismuth. Previous work has shown that ZT can be enhanced for granular systems, [L. D. Hicks and M. Dresselhaus, Phys. Rev. B47, 12727 (1993) and L. D. Hicks et al., Appl. Phys. Lett. 63, 3230 (1993)]. However, while observations show that ZT increases with decreasing grain size d below 3 $\mu$m, it declines for smaller particle sizes (due to a disproportionately large decrease of $\sigma$ caused by small-particle grain boundaries) [see D. M. Rowe in "CRC Handbook of thermoelectrics" ed. D. M. Rowe, CRC Press, Florida, 1995, pp 43–53]. The nanostructured materials of this invention, having a periodic structure with continuous pathways and regular structural features, can avoid this problem at small dimensional scales. The examples demonstrate a process of this invention in which chemical vapor deposition of $SiH_4$ results in a coating of silicon on carbon inverse opals. In this case, exposure to a hydrogen plasma removes the carbon, thereby providing a silicon-based inverse opal thermoelectric. Replacement of $SiH_4$ with a $SiH_4/GeH_4$ mixture (preferable 5:1 ratio) will result in deposition of $Si_{0.8}Ge_{0.2}$ coating on the inner surfaces of opal. The lower thermal conductivity of $Si_{0.8}Ge_{0.2}$ alloy, compared with pure Si, would improve the figure of merit of the system.

Various polymeric compositions are preferred as infiltrated materials for the purpose of invention embodiments, especially those in which the use is an optical application.

Examples of these compositions and the range of their refractive indices (when unorientated) at 589 nm are as follows: polyolefins (1.47–1.52), polystyrenes (1.59–1.61), polyfluoro-olefins (1.35–1.42), non-aromatic non-halogenated polyvinyls (1.45–1.52), polyacrylates (1.47–1.48), polymethacrylates (1.46–1.57), polydienes (1.51–1.56), polyoxides (1.45–1.51), polyamides (1.47–1.58), and polycarbonates (1.57–1.65). Especially preferred polymers for optical applications are those that have little light scattering in the visible due to imperfections, such as polymers that are either amorphous or have crystallite sizes that are much smaller than the wavelength of visible light. Phenolic-based resins and furfuryl-alcohol based resins are also especially preferred for invention embodiments.

Phenolic derived polymers are specially preferred for the fabrication of inverse opal colorants for plastics and the creation of carbon inverse opals by the pyrolysis of organic polymers. Silicon containing acetylenic polymers [such as poly[(phenylsilylene)ethynylene-1,3-phenylene-ethynylene] described by M. Itoh et al. in Advanced Materials 9, 1187 (1997)] are especially preferred for the formation of polymeric inverse opals that can be pyrolized with little weight loss. The reason for this preference is this low weight loss, and the extremely high stability of the resulting inverse opal product comprising carbon reacted with silicon (which is stable in air when heated red hot).

Various ferroelectric polymers are preferred as infiltrated materials for the purpose of invention embodiments. The term ferroelectric polymer as used herein includes both homopolymers and all categories of copolymers, such as random copolymers and various types of block copolymers. This term also includes various physical and chemical mixtures of polymers. Poly(vinylidene fluoride) copolymers, such as poly(vinylidene fluoride-trifluoroethylene), P(VDF-TrFE), are especially preferred ferroelectric polymer compositions. Additional copolymers of vinylidene fluoride that are especially preferred as infiltrated materials for the three-dimensionally periodic structures of the present invention are described by Tournut in Macromolecular Symposium 82, pp. 99–109 (1994). Other especially preferred ferroelectric polymer compositions are the copolymers of vinylidene cyanide and vinyl acetate (especially the equal mole ratio copolymer) and odd nylons, such as nylon 11, nylon 9, nylon 7, nylon 5, nylon 3 and copolymers thereof.

Various conducting polymers in either doped or undoped forms are preferred infiltration materials for embodiments of this invention. The most preferred conducting polymers are polyaniline, polythiophene, polypyrrole, poly(phenylene vinylene), poly(phenylene), and copolymers and substituted polymers involving chain backbone segments that are segments of the former polymers.

Various inorganic compositions are preferred as infiltrated materials for the purpose of invention embodiments, especially those in which the use is an optical application. Examples of these compositions and the range of their refractive indices at 589 nm are as follows: 1) metal oxides such as titanium dioxide, zinc oxide, silica, zirconium oxide, and alumina; 2) carbon phases such as diamond (n about 2.42), glassy carbon, graphite, Lonsdaleite, and diamond-like carbon; 3) other high refractive index inorganics such as bismuth oxychloride (BiOCl), barium titanate ($n_o$ between 2.543 and 2.339 and $n_e$ between 2.644 and 2.392 for wavelengths between 420 and 670 nm), potassium lithium niobate ($n_o$ between 2.326 and 2.208 and $n_e$ between 2.197 and 2.112 for wavelengths between 532 and 1064 nm), lithium niobate (no between 2.304 and 2.124 and $n_e$ between 2.414 and 2.202 for wavelengths between 420 and 2000 nm), lithium tantalate ($n_o$ between 2.242 and 2.112 and $n_e$ between 2.247 and 2.117 for wavelengths between 450 and 1800 nm), proustite ($n_o$ between 2.739 and 2.542 and $n_e$ between 3.019 and 2.765 for wavelengths between 633 and 1709 nm), zinc oxide ($n_o$ between 2.106 and 1.923 and $n_e$ between 2.123 and 1.937 for wavelengths between 450 and 1800 nm), alpha-zinc sulfide ($n_o$ between 2.705 and 2.285 and $n_e$ between 2.709 and 2.288 for wavelengths between 360 and 1400 nm), and beta-zinc sulfide ($n_o$ between 2.471 and 2.265 for wavelengths between 450 and 2000 nm). As is conventional, $n_o$ and $n_e$ in the above list of refractive indices denote the ordinary and extraordinary refractive indices, respectively, for crystals that are optically anisotropic. The no refractive index is for light propagating down the principal axis, so there is no double refraction, and the $n_e$ refractive index is for light having a polarization that is along the principal axis.

Ferroelectric ceramics (such as barium titanate and solid solutions of $BaTiO_3$ with either $SrTiO_3$, $PbTiO_3$, $BaSnO_3$, $CaTiO_3$, or $BaZrO_3$) are preferred compositions for the opal derived compositions of the present invention embodiments. Ceramics that are relaxor ferroelectrics are also preferred ferroelectrics for invention embodiments. Relaxor ferroelectrics that are especially preferred for the present invention have the lead titanate type of structure ($PbTiO_3$) and disorder on either the Pb-type of sites (called A sites) or the Ti-type of sites (called B sites). Examples of such relaxor ferroelectrics having B site compositional disorder are $Pb(Mg_{1/3}Nb_{2/3})O_3$ (called PMN), $Pb(Zn_{1/3}Nb_{2/3})O_3$ (called PZN), $Pb(Ni_{1/3}Nb_{2/3})O_3$ (called PNN), $Pb(Sc_{1/2}Ta_{1/2})O_3$, $Pb(Sc_{1/2}Nb_{1/2})O_3$ (called PSN), $Pb(Fe_{1/2}Nb_{1/2})O_3$ (call PFN), and $Pb(Fe_{1/2}Ta_{1/2})O_3$. Further examples of relaxor ferroelectrics with B-site disorder are solid solutions of the above compositions, such as $(1-x)Pb(Mg_{1/3}Nb_{2/3})O_3-xPbTiO_3$ and $(1-x)Pb(Zn_{1/3}Nb_{2/3})O_3-xPbTiO_3$. Another more complicated relaxor ferroelectric that is preferred for the present invention is $Pb_{1-x}^{2+}La_x^{3+}(Zr_yTi_z)_{1-x/4}O_3$, which is called PLZT. PZT (lead zirconate titanate, $PbZr_{1-x}Ti_xO_3$) is an especially preferred ferroelectric ceramic for invention embodiments. PMN (lead magnesium niobate, $Pb(Mg_{1/3}Nb_{2/3})O_3$) is another especially preferred material, which becomes ferroelectric below room temperature. Ceramic compositions obtained by the addition of up to 35 mole percent $PbTiO_3$ (PT) to PMN are also especially preferred, since the addition of PT to PMN provides a method for varying properties (such as increasing the Curie transition temperature and varying the refractive indices) and since a relaxor ferroelectric state is obtainable using up to 35 mole percent of added (i.e., alloyed) PT. Ceramic compositions that undergo a field-induced phase transition from the antiferroelectric to the ferroelectric state are also preferred for obtaining composites that undergo electric-field-induced switching of coloration. One preferred family is the $Pb_{0.97}La_{0.02}(Zr, Ti, Sn)O_3$ family that has been found by Brooks et al. (Journal of Applied Physics 75, pp. 1699–1704 (1994)) to undergo the antiferroelectric to ferroelectric transition at fields as low as 0.027 MV/cm. Another family of such compositions is lead zirconate-based antiferroelectrics that have been described by Oh et al. in "Piezoelectricity in the Field-Induced Ferroelectric Phase of Lead Zirconate-Based Antiferroelectrics", J. American Ceramics Society 75, pp. 79–799 (1992) and by Furuta et al. in "Shape Memory Ceramics and Their Applications to Latching Relays", Sensors and Materials 3,4, pp. 205–215 (1992).

For applications in which reversible color changes in response to temperature changes are desired, ceramics that undergo reversible electronic phase changes are particularly preferred as infiltrated materials for the present invention. Such compositions that undergo reversible transitions to highly conducting states upon increasing temperature are $VO_2$, $V_2O_3$, NiS, $NbO_2$, $FeSi_2$, $Fe_3O_4$, $NbO_2$, $Ti_2O_3$, $Ti_4O_7$, $Ti_5O_9$, $V_{1-x}M_xO_2$, where M is a dopant that decreases the transition temperature from that of $VO_2$ (such as W, Mo, Ta, or Nb) and where x is much smaller than unity. $VO_2$ is an especially preferred color-changing particle additive, since it undergoes dramatic changes in both the real and imaginary components of refractive index at a particularly convenient temperature (about 68° C.). The synthesis and electronic properties of these inorganic phases are described by Speck et al. in Thin Solid Films 165, 317–322 (1988) and by Jorgenson and Lee in Solar Energy Materials 14, 205–214 (1986).

Preferred thermoelectrics for making thermoelectric opal-derived composites by the methods of the present invention embodiments are as follows: bismuth, bismuth-tellurides ($Bi_2Te_3$-based alloys), bismuth antimonides ($Bi_{1-x}Sb_x$, alloys with $0.02<x<0.13$), and $Bi_2Te_3$ alloyed with $Sb_2Te_3$. Especially preferred thermoelectrics for this application are $Bi_{25}Sb_{68}Te_{142}Se_6$ (with ZT=0.96, p-type), $Bi_{0.5}Sb_{1.5}Te_{3.13}$ (with ZT=0.9, p-type), $Bi_{1.75}Sb_{0.25}Te_{3.13}$ (with ZT=0.66, n-type), $(Sb_2Te_3)_5(Bi_2Te_3)_{90}(Sb_2Se_3)_5$ (with ZT=0.96, n-type). The infiltration of these alloys into opal-derived structures of this invention is preferably accomplished by melt infiltration at the lowest pressure compatible with infiltration (to decrease the tendency that we observe for the phases to disproportionate) and by chemical vapor deposition. These bismuth, tellurium, and bismuth alloys are preferably used for opal-derived thermoelectrics operating at either close to ambient or at lower temperatures. Preferred examples of compositions for opal-derived thermoelectrics that operate at higher temperatures (about 700 to above 1000 K) are PbS, PbSe, and PbTe and silicon-germanium alloys (Si—Ge). An especially preferred composition is $Si_{0.7}Ge_{0.3}$. Other preferred thermoelectric compositions for infiltration into the opal-derived structures of the present invention embodiments are the skutterudites, for which $CoSb_3$, $IrAs_3$, $RhP_3$ are the simplest examples and $LaCo_{3-x}Fe_xSb_{12}$ is a more complex example.

Photopolymerizable monomers, photo-dopable polymers, photo-degradable polymers, and photo cross-linkable polymers are preferred for an invention embodiment in which patterned exposure to actinic radiation (in the gamma ray through visible frequency range) is used for obtaining inverse opals having (a) arbitrary shape or patterning or (b) a patterned distribution in properties for the infiltrated material (such as a desired distribution in refractive index). For example, a patterned thin layer deposition of inverse opal can be obtained on a substrate by (a) growing thin $SiO_2$ opal sheets on a substrate, (b) annealing these sheets so as to obtain the inter-sphere interconnections that facilitate sphere extraction, (c) infiltrating the $SiO_2$ sphere sheets with a photoresist, (d) irradiating this photoresist in a patterned manner with actinic radiation (for example, using a patterned mask), and (e) extracting both the $SiO_2$ spheres and either the irradiated on non-irradiated photoresist. The resulting patterned deposition of inverse opal can then be either used in this form for applications (such as optical circuitry) or subjected to further infiltration/extraction steps to provide patterned depositions of other opal derived materials. Materials suitable for this use are described, for example, in Chapter 1 (pages 1–32) written by J. E. Lai in the book entitled "Polymers for Electronic Applications", which is also edited by the same author (CRC Press, Boco Raton Fla., 1989). Improved materials that are now being introduced are described by G. M. Wallraff et al. in CHEMTECH, pp. 22–30, April 1993. More exotic compositions suitable for the present application are described by M. S. A. Abdou, G. A. Diaz-Guijada, M. I. Arroyo, and S. Holdcroft in Chem. Mater. 3, pp. 1003–1006 (1991).

The following examples are presented to more particularly illustrate the invention, and should not be construed as being limitations on the scope of the invention.

EXAMPLE 1

Figure 1:
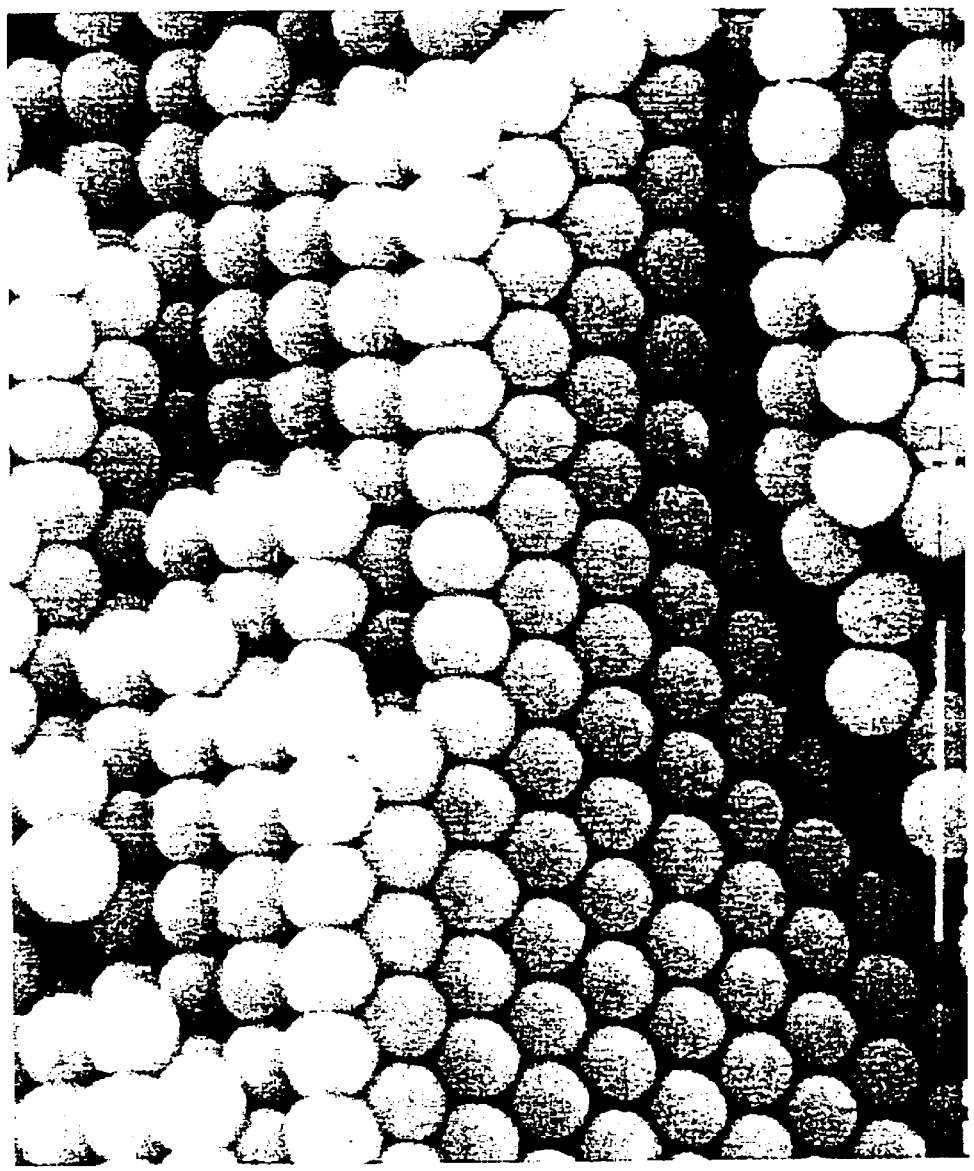
FIG. 1 is a scanning electron micrograph of porous $SiO_2$ opals used as templates in some of the invention embodiments. The sphere diameter is 250 nm. These opals have been sintered sufficiently to generate necks between spheres, but not so completely as to close the pore volume interconnections that are required for infiltration.
Figure 4:
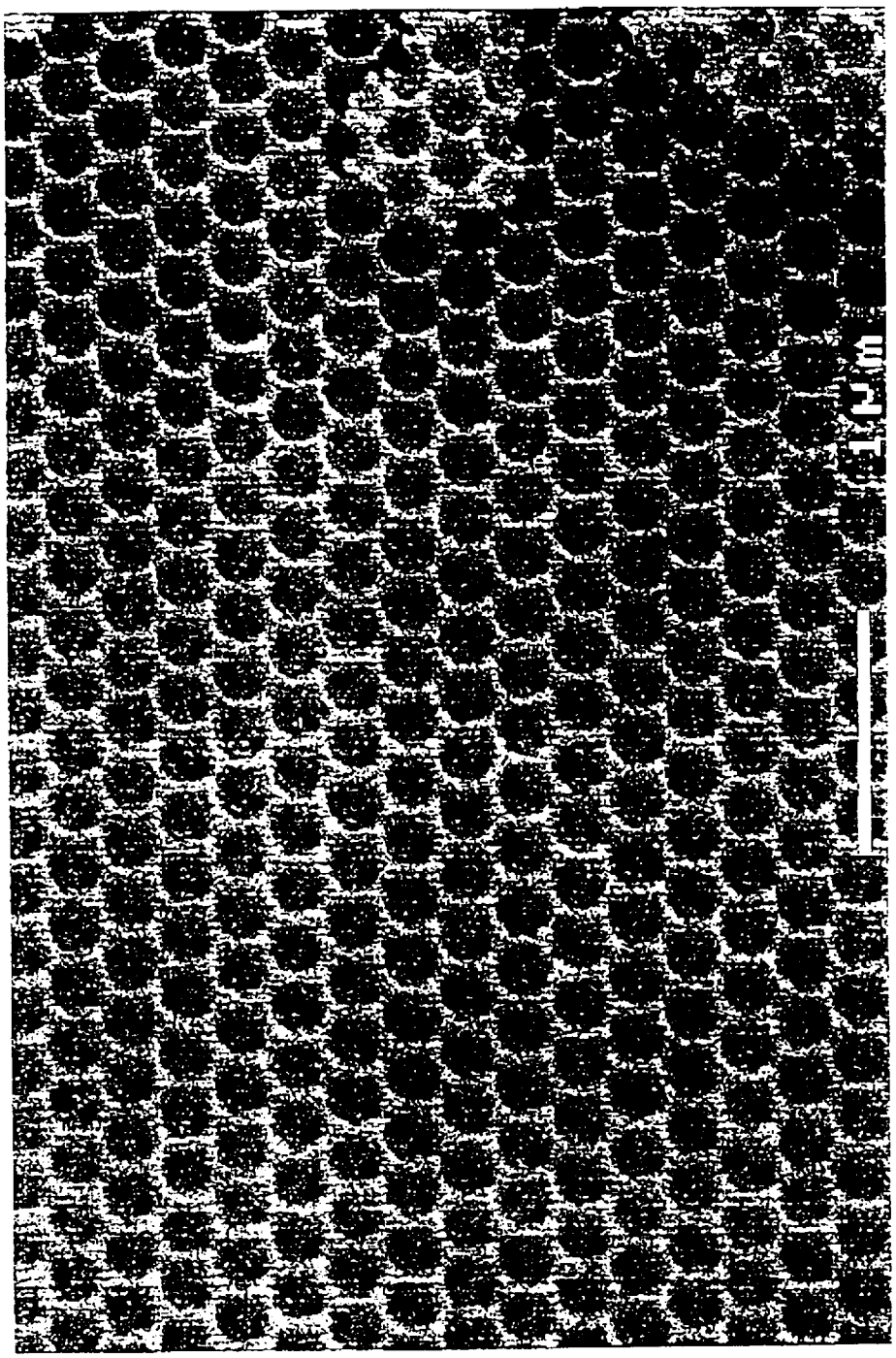
FIG. 4 is a scanning electron micrograph of a (111) plane of a volumetrically-templated phenolic inverse opal made by the process embodiment of Example 1, which uses the opal type shown in FIG. 1. The holes in the spherical shells (left by the extraction of the $SiO_2$ spheres of the porous opal template) correspond to the necks between the original $SiO_2$ spheres, which enabled the extraction process.

This example demonstrates the fabrication of a phenolic inverse opal by the templating of a sintered porous opal that has a periodic structure at optical wavelengths. FurCarb® Resin (187 g, LP-520, which is a furfuryl-based phenolic resin available from Great Lakes Chemical Corporation, P. O. Box 2200, West Lafayette, Ind. 47906) was vigorously stirred for ten minutes at room temperature after adding four drops of hydrochloric acid (37.5 wt %, Fisher) as the catalyst for polymerization. A piece of sintered porous opal (FIG. 1) composed of 250 nm $SiO_2$ spheres was placed into a small Teflon coated aluminum cup containing about 1.5 gm of the above resin containing HCl catalyst. After two days at room temperature, during which time the resin infiltrated the opal, the resin was cured in an oven for three days at 80° C., two days at 100° C., and finally two days at 130° C. The cured resin was black. After removing the cured resin around the resin-infiltrated opal by grinding, this opal showed intense opalescence. The surface of the infiltrated opal was cleaned for five rminutes using a plasma cleaner. Thereafter, the weight of the phenolic infiltrated opal was 49.7 mg. The $SiO_2$ spheres were removed from this sample by dissolution in hydrofluoric acid (48%) for three hours. The $SiO_2$-free sample was then thoroughly washed with water and then dried over anhydrous $CaSO_4$ for one hour under vacuum. The resulting product was an inverse phenolic inverse opal (weighing 7.1 mg) having the same shape and size as the starting $SiO_2$ opal and showing brilliant colors depending upon the diffraction of light by the periodic inverse opal structure. Scanning electron microscopy (SEM) investigation of a fractured surface of this inverse opal indicates that all silica spheres were dissolved by the hydrofluoric acid. The SEM picture revealed a periodically arranged and interconnected structure that reliably replicated the void space in the original $SiO_2$ opal (FIG. 4). This new type of material is called a polymer inverse opal, since a polymer structure replicates the void space in the original opal.

EXAMPLE 2

This example demonstrates the intense diffraction-based coloration of the polymer inverse opal and the switching of coloration. A piece of the phenolic inverse opal was prepared according to the previous example. It showed a brownish light-blue color. This inverse opal was broken into four pieces, which were placed in hexane, ethanol, acetone, and water, respectively. The sample in hexane showed a bright green color. The one in acetone gave red, green, and yellow opalescence depending on the orientation of the sample region with respect to the incident light. The one in ethanol offered a light yellow-green color. The one in water did not substantially change its color from that of the liquid-free inverse opal. These differences in coloration in the different liquids are attributed to the difference between the refractive indices of these liquids (which are 1.375, 1.359, 1.357, and 1.333 for hexane, ethanol, acetone, and water, respectively).

EXAMPLE 3

The samples comprising cured phenolic resin in $SiO_2$ opal were prepared according to the procedure in Example 1. These samples were then embedded in the powder of the cured resin and carbonized under argon using the following thermal process. The sample temperature was increased from room temperature to 750° C. in five hours, maintained at 750° C. for three hours, and then cooled down to room temperature without temperature control. After the samples were treated with an oxygen-plasma for 5 minutes, they showed opalescence on a dark-black background. Then the samples were further treated with hydrofluoric acid for 2.5 hours, repeatedly washed with water, and dried over anhydrous $CaSO_4$. This overall process, used for removing the silica spheres decreased the sample weight by about 87 to 90%, but did not cause a change in sample size and shape. This sample was opalescent and did not noticeable change coloration when immersed in liquids having various refractive indices. An x-ray powder diffraction analysis indicates that the carbon in the inverse opal is amorphous. Also, SEM images show that the carbon inverse opal consists of periodical structure that is a replica of the void space in the original opal. Inverse carbon opals prepared in this way have sufficient mechanical strength for use as templates, which will be described in subsequent examples.

EXAMPLE 4

Figure 11:
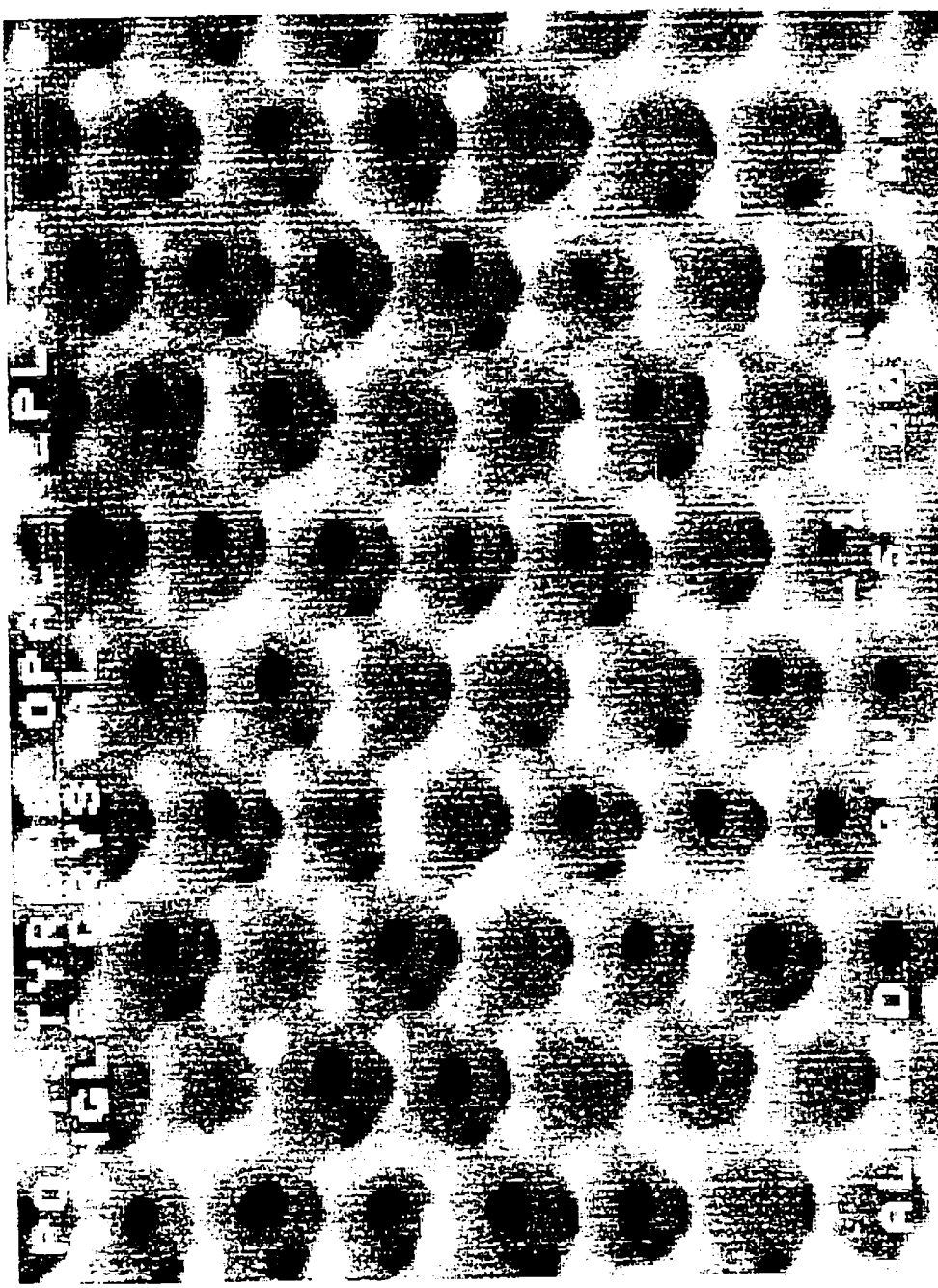
FIG. 11 is a scanning electron micrograph showing a (111) surface of a volumetrically templated polystyrene inverse opal, which was made by the process embodiment of Example 4.

This example demonstrates the preparation of a polystyrene inverse opal (FIG. 11) using the in-situ polymerization of styrene inside the porous opal. This example shows that the glass transition of the polystyrene is decreased (compared with that of bulk polystyrene) as a result of the small dimensional scale of the structural elements of this polystyrene inverse opal. A piece of synthetic opal was placed in styrene monomer (Aldrich, 99+%) containing 1.0 wt % 2,2'-azobisisobutyronitrile (Aldrich, 98%) for four hours under vacuum at room temperature. This treatment allowed the styrene and initiator to infiltrate the opal. Polymerization of the polystyrene in the opal was carried out at 60–80° C. for 24 hours. After removing the extra polystyrene around the opal by grinding, the polystyrene-infiltrated opal was immersed into hydrofluoric acid (Aldrich, 48 wt % in water) for about one hour to dissolve the $SiO_2$ spheres. Residual hydrofluoric acid was removed from the resulting inverse opal by repeated washing with water. This polystyrene inverse opal showed colorful opalescence and was composed of a three-dimensional array of interconnected holes in a polystyrene matrix. The polystyrene inverse opal dissolved completely in FurCarb® 520 at 100° C. and was deformed and partially dissolved in chloroform. The glass transition temperature of the polystyrene inverse opal was measured by differential scanning calorimetry (10° C./min) and found to be 85.52° C., which is 6° C. higher than that measured by the same method for bulk polystyrene. This result indicates that one can modify polymer thermal properties by the confinement in local dimension provided by the dimensional scale of the inverse opal lattice.

EXAMPLE 5

This example demonstrates the fabrication of a poly (methyl methacrylate) (PMMA) inverse opal. A piece of the porous $SiO_2$ opal of the type described in Example 1 was placed for four hours in methyl methacrylate monomer (Aldrich, 99%) containing 1.0 wt % 2,2'-azobisisobutyrontrile (Aldrich, 98%). This exposure permitted the infiltration of the monomer into the opal. The monomer was polymerized within the opal at 40–60° C. for 24 hours. After removing the excess polymer around the opal by grinding, the filled opal was immersed in hydrofluoric acid (Aldrich, 48 wt.% in water) to dissolve the $SiO_2$ spheres. After repeated washings in water and drying in air, the PMMA inverse opal was obtained as a contaminant-free product. This PMMA inverse opal was composed of a three-dimensionally periodic array of air-filled, spherical voids.

EXAMPLE 6

This example demonstrates the formation of an inverse opal based on another epoxy composition, and then the conversion of this epoxy into an inverse opal of a hard carbon. The porous opal used as primary opal template was the same as for Example 1, and the preparation method was similar to that of Example 1. The porous silica opal was filled by a mixture of 30 ml Epox® 812 resin, 24.5 ml nadic methyl anhydride, and 1.1 ml tris-dimethylaminomethyl phenol (Ernest F. Fullam Inc.), and then reacted by thermal annealing for 24 hours at 60° C. The $SiO_2$ was extracted from the phenolic-filled opal using HF (Aldrich, 48 wt. % in water), and the sample was then repeatedly washed and dried, as described in Example 1. The resulting phenolic inverse opal was pyrolyzed under argon at 900° C. for one hour. The resulting carbon inverse opal was opalescence, and found by SEM to be a three-dimensionally periodic array of interconnected, nearly spherical holes. This process also works to provide a carbon inverse opal when the above mixture is replaced with a mixture of 30 ml Epox® 812 resin, 44.8 ml dodecyl succinic anhydride, and 1.5 ml tris-dimethylaminomethyl phenol (Ernest F. Fullam Inc.).

EXAMPLE 7

Figure 5:
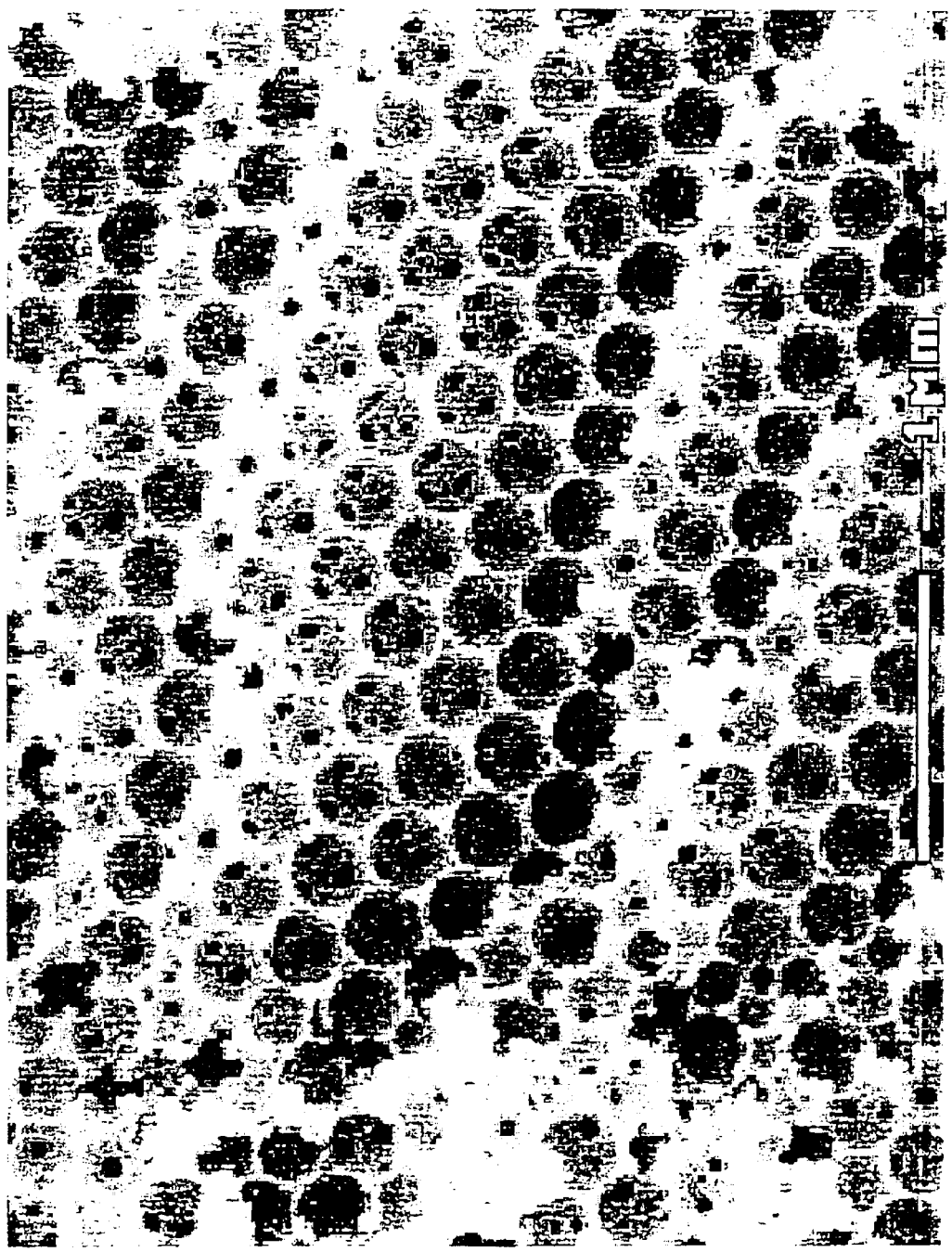
FIG. 5 is a scanning electron micrograph of a (111) plane of a glassy carbon inverse opal resulting from the pyrolysis of a phenolic filled $SiO_2$ opal, followed by $SiO_2$ extraction (see Example 7).

This example describes two different methods for forming a hard carbon inverse opal. A porous $SiO_2$ opal was infiltrated over a two day period at room temperature with a mixture of 187 g FurCarb® 520 resin and four drops concentrated hydrochloric acid (Aldrich, 37 wt. % in water). Polymerization of the resin in the silica opal was accomplished by thermal annealing at 80° C. for two days, at 100° C. for two days, and finally at 150° C. for two days. Two samples of this FurCarb® filled opal were treated using two different procedures: (i) the first sample was pyrolyzed at 900° C. under argon for one hour and then immersed in a hydrofluoric acid solution (Aldrich, 48 wt. % in water) in order to remove the silica spheres and (ii) the second sample was immersed in a hydrofluoric acid solution (Aldrich, 48 wt. % in water) in order to remove the silica spheres, and then pyrolyzed at 900° C. under argon for one hour. In both cases the resulting samples were FurCarb® inverse opals consisting of a periodic array of interconnected hollow spheres. Both samples showed opalescence resulting from this structural periodicity. However, the carbon sample that was pyrolyzed before extraction of the silica (see FIG. 5) had porosity resulting from the pyrolysis process, which was substantially absent for the sample that was pyrolyzed after extraction of the silica. SEM before and after the pyrolysis of the phenolic resin indicates a 25% contraction for the sample that had been extracted using HF before pyrolysis. Corresponding in part to this contraction (which was prevented in the sample that is pyrolyzed before extraction of the $SiO_2$ spheres) the color of the carbonized phenolic is blue (while the unpyrolized phenolic is green).

EXAMPLE 8

This example demonstrates the application of the FurCarb® inverse opal prepared in Example 1 for the preparation of three-dimensionally periodic inverse opal filled with polystyrene. This opal is a periodic composite of phenolic and polystyrene which is periodic at optical wavelengths. A piece of the FurCarb® inverse opal was placed for four hours in a solution of a 100:1 weight ratio of styrene monomer (Aldrich, 99+%) and 2,2'-azobisisobutyrontrile (Aldrich, 98%)—which enabled the infiltration of the inverse opal with the styrene. The styrene was then polymerized at 60–80° C. for 24 hours. The product was ground into the size of the original opal replica, so as to remove excess polystyrene from around the inverse opal. The resulting product (showing predominately green opalescence) was shown by SEM to be a three-dimensionally periodic arrangement of interconnected polystyrene spheres in a three-dimensionally periodic FurCarb® matrix.

EXAMPLE 9

This example demonstrates the formation of an elastomeric opal based on a silicone elastomer. The inverse polystyrene inverse opal made by the process of Example 4 was infiltrated with a mixture of Sylgard® 184 and Sylgard® 184 curing agent (10:1 by weight) and cured at room temperature for 48 hours. The inverse opal filled with the silicone elastomer was ground into the size of the original polystyrene inverse opal and then immersed in toluene to remove the polystyrene matrix. The resulting opal consisting of only of the silicone elastomer showed strong opalescence when immersed in toluene.

EXAMPLE 10

This example demonstrates the formation of carbon inverse opals by a chemical deposition (CVD) process in which carbon is formed on a porous opal, and the silica is removed by treatment with aqueous HF. For a first sample, the carbon was coated on the internal surface of a opal (300 nm diameter spheres) by passing a one atmosphere mixture of 25% propylene ($C_3H_6$) and 75% nitrogen through a heated quartz tube (800° C.) in which the opal specimen (2 cm width, 4 cm length, and 2 mm thickness) was placed. The CVD time was twelve hours. For a second sample, the carbon was coated on the internal surface of a opal (220 nm diameter spheres) by passing the above gas mixture through a heated quartz tube (800° C.) in which the opal specimen (2 cm width, 5 cm length, and 1 mm thickness) was placed. The CVD time was six hours. For a third sample, the carbon was coated on the internal surface of a opal (consisting of 160 nm diameter spheres) by passing a one atmosphere of propylene gas through a heated quartz tube (900° C.) in which the opal specimen (2 cm width, 4 cm length, and 1 mm thickness) was placed. The CVD time was six hours. Each of the above samples was placed in concentrated aqueous HF for 12 hours, and then repeatedly washed with water and dried in air. In each case the product was an opalescent carbon inverse opal that SEM investigation showed was a three-dimensionally periodic carbon foam. Typical electrical conductivities measured for these foams (by the four point probe method) were about 110–120 mΩ-cm. These values are comparable to those that we obtained for the phenolic-derived glassy carbon inverse opals (typically 130–170 mΩ-cm).

EXAMPLE 11

This example demonstrates the application of FurCarb® inverse opal prepared in Example 1 for the preparation of three-dimensionally periodic inverse opal filled with poly (methyl methacrylate). This opal is a periodic composite of phenolic and poly(methyl methacrylate) which is periodic at optical wavelengths. A piece of the FurCarb® inverse opal was placed for four hours in a solution of a 100:1 weight ratio of methyl methacrylate monomer (Aldrich, 99+%) and 2,2'-azobisisobutyrontrile (Aldrich, 98%)—which enabled the infiltration of the inverse opal with the methyl methacrylate. The methyl methacrylate was then polymerized at 60–80° C. for 24 hours. The product was ground into the size of the original opal replica, so as to remove excess methyl methacrylate from around the inverse opal. The resulting product (showing predominately green/red opalescence) was shown by SEM to be a three-dimensionally periodic arrangement of interconnected poly(methyl methacrylate) spheres in a three-dimensionally periodic FurCarb® matrix.

EXAMPLE 12

Figure 12:
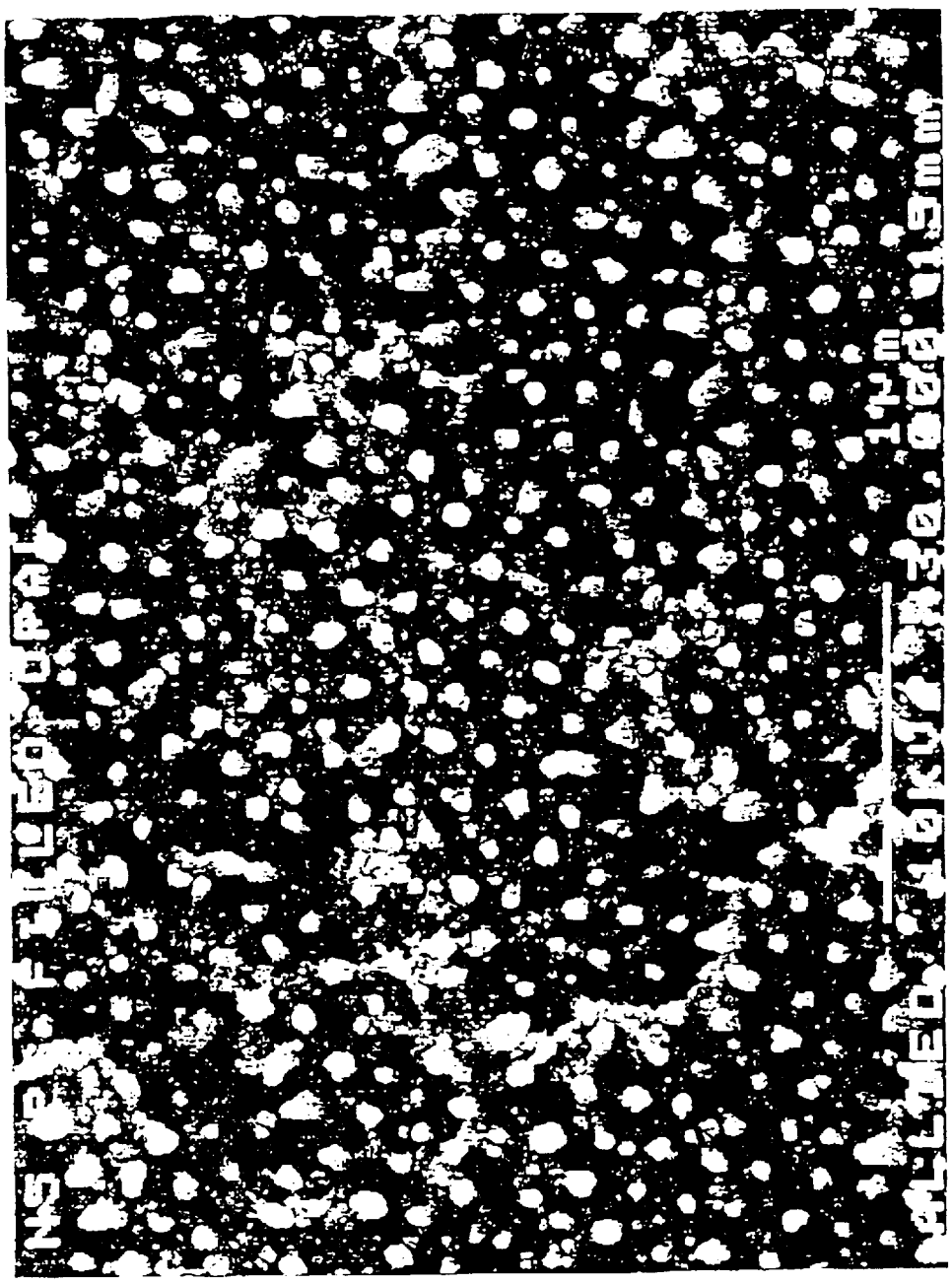
FIG. 12 is a scanning electron micrograph showing a (111) fracture surface of a phenolic-derived, volumetrically-templated carbon inverse opal, which was filled during a second infiltration/polymerization step with polystyrene (see Example 12). The white appearing structure component is the polystyrene. The darker surrounding material is the glassy carbon of the inverse opal.

This example demonstrates the preparation of a polystyrene/glassy-carbon composite that consists of a phenolic-derived glassy-carbon inverse opal whose void space is filled with polystyrene. The glassy-carbon inverse opal was made by the process of Example 3. A piece of the glassy-carbon inverse opal was placed in styrene monomer (Aldrich, 99+%) containing 1.0 wt % 2,2'-azobisisobutyronitrile (Aldrich, 98%) for four hours under vacuum at room temperature. This treatment allowed the styrene and initiator to infiltrate the inverse opal. Polymerization of the polystyrene in the inverse opal was carried out at 60–80° C. for 24 hours. The electron micrograph of FIG. 12 shows that the resulting three-dimensionally periodic composite contains a polystyrene direct opal lattice that interpenetrates a glassy carbon inverse opal lattice.

EXAMPLE 13

Figure 7:
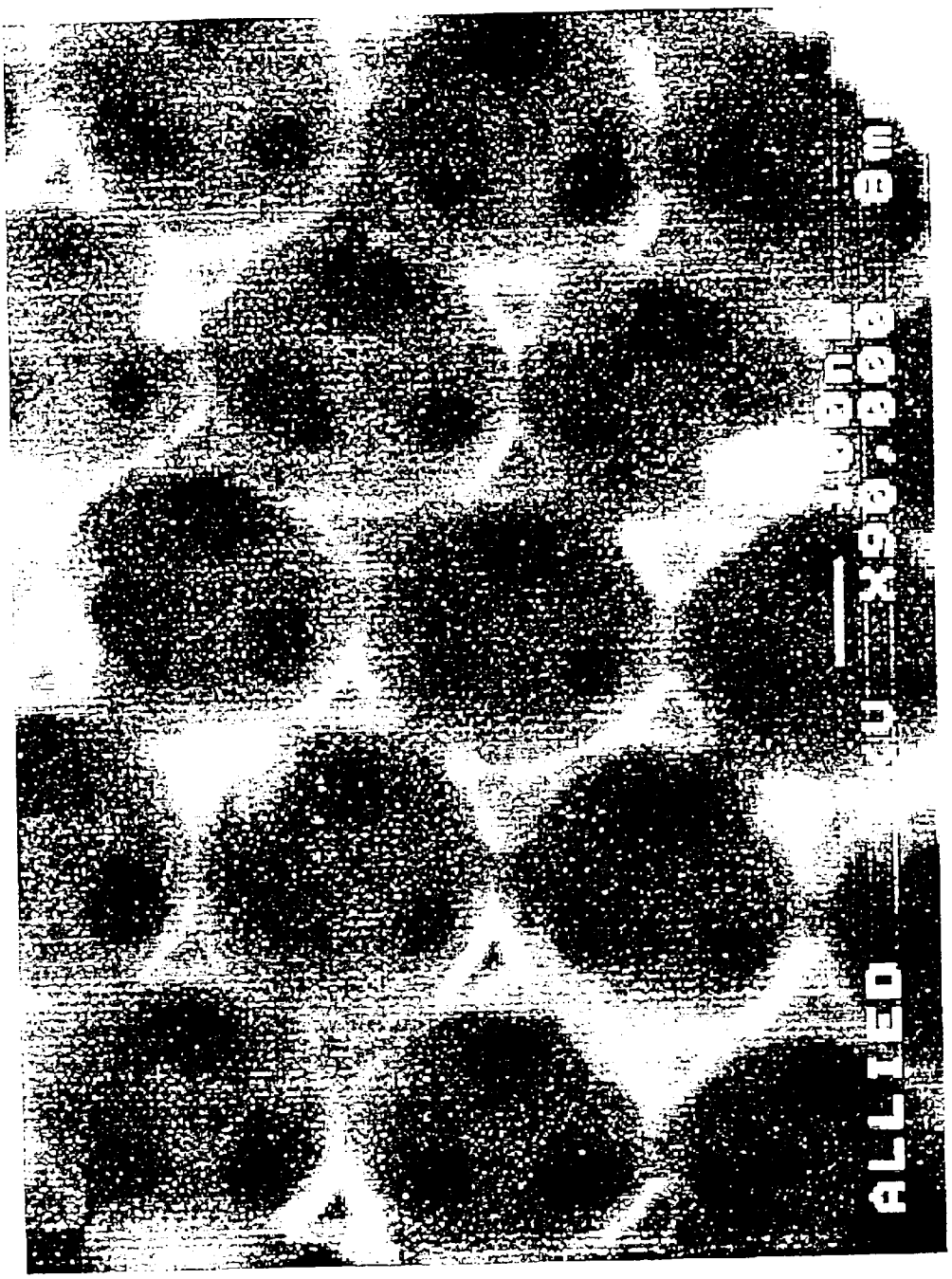
FIG. 7 is a scanning electron micrograph showing a (111) plane of the diamond inverse opal made by the process embodiment of Example 13.
Figure 8:
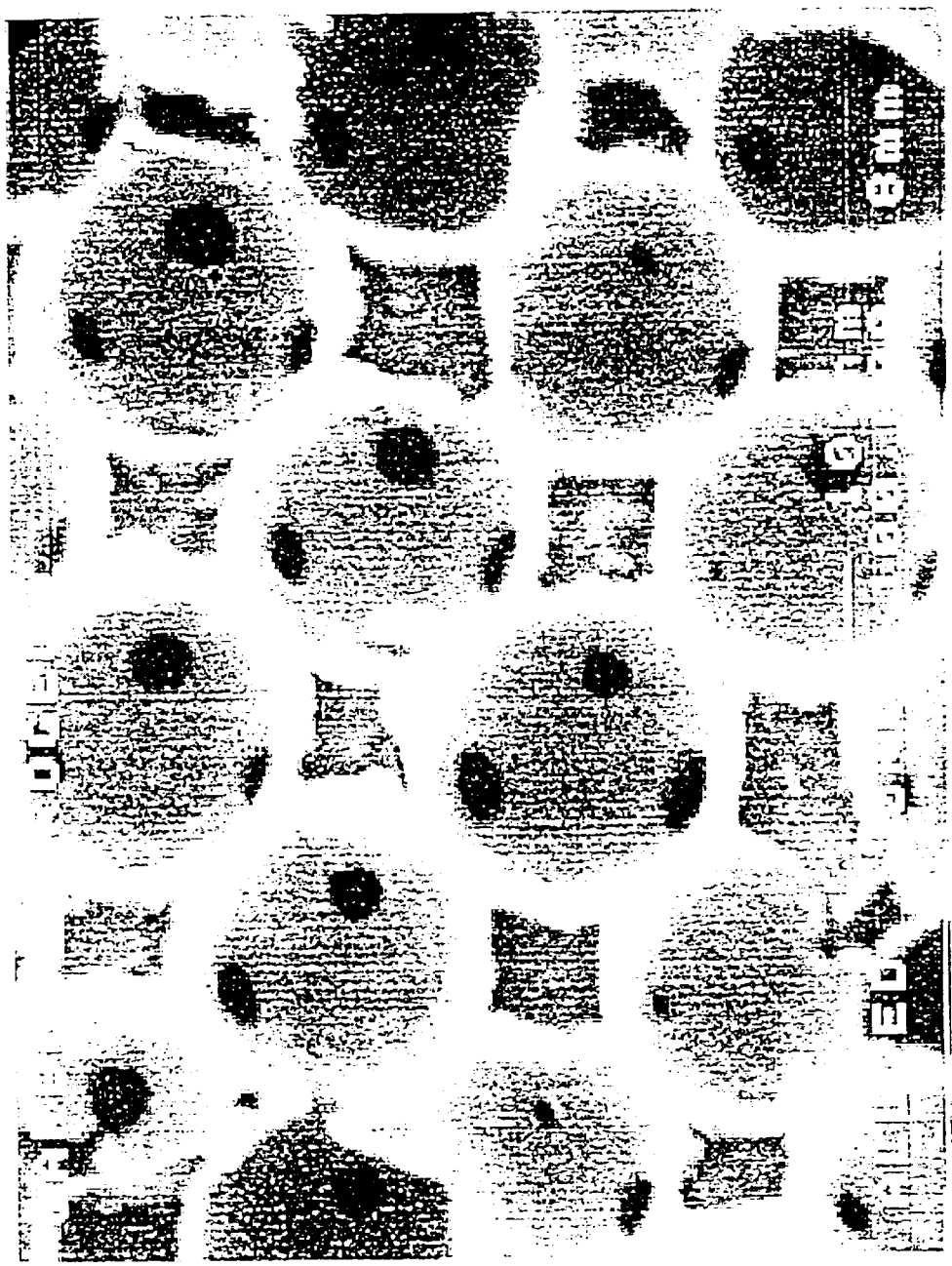
FIG. 8 is scanning electron micrograph showing a (100) surface of a graphite inverse opal made by the process embodiment of Example 13, which uses plasma enhanced CVD.
Figure 10:
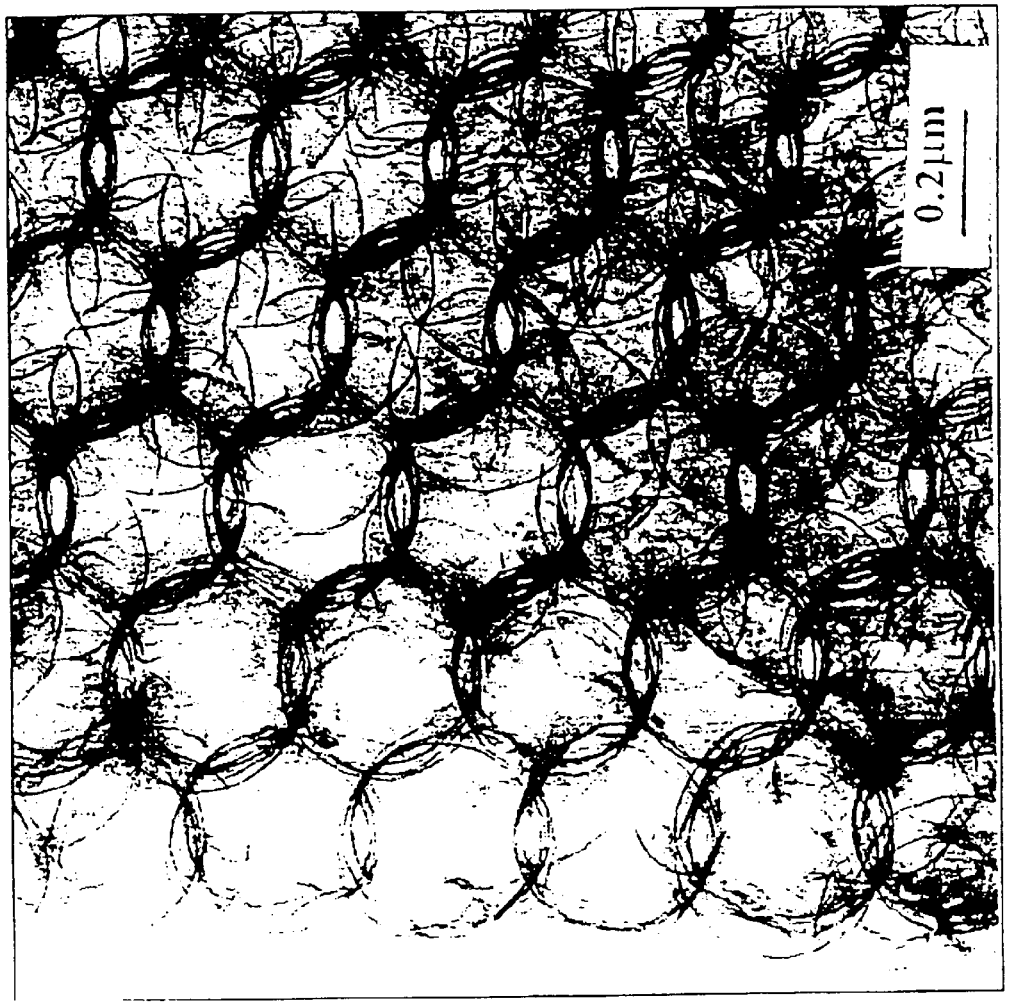
FIG. 10 is transmission electron micrograph showing a surface-templated graphite inverse opal having a wall thickness of only about 40 Å. This material was made by the process embodiment of Example 13, which uses plasma enhanced CVD.

This example demonstrates the preparation of sheets of diamond inverse opal, sheets of volumetrically-templated carbon inverse opal, and sheets of surface-templated graphite inverse opal, called cubic graphite. This process was by plasma enhanced CVD of carbon in diamond particle seeded $SiO_2$ opal, followed by the extraction of the $SiO_2$ spheres using aqueous HF. The diamond nuclei were seeded within millimeter opal plates by ultrasonic agitation of these plates in an acetone suspension of 5 nm diamond grit. A microwave-plasma-enhanced chemical-vapor-deposition reactor operating at 2.45 GHz and 3.5 kW [V. G. Ralchenko et al., Diamond and Related Materials 6, 159 (1997)] was used to infiltrate carbon into opal plates (comprising 250 nm $SiO_2$ spheres) from a $CH_4$-$H_2$ fed plasma (50–60 Torr pressure and gas flows of 972 sccm for $H_2$ and 25 sccm for $CH_4$). The deposition substrate temperature reached by plasma heating was 750–850° C. and the deposition time was 64 hours. After attaching the diamond surface of a carbon-infiltrated opal sheets to a graphite plate substrate (using colloidal graphite paint), the $SiO_2$ spheres were removed using a one day exposure to 10% hydrofluoric acid, and the samples were repeatedly washed with water. The structure of the extracted material depends upon the proximity to the exterior surface of the original opal plate. About a 60 $\mu$m thick layer of cubic diamond (containing micron size crystallites with typical diamond crystal morphology) exists on the exterior surface of the opal that was closest to the plasma. The carbon inverse opal closest to this surface is a 30 $\mu$m thick layer arising from essentially complete filling of the porous opal with ordinary cubic diamond (identified by the electron diffraction pattern and a strong line at 1332 $cm^{-1}$ in the micro-Raman spectra). While poor adhesion is typically a problem in diamond coating technology, the exterior diamond layer is intimately connected to the. diamond inverse opal. Scanning electron micrographs show that the lattice of interconnected octahedral and tetrahedral voids of the starting opal is replicated in the structure of the diamond inverse opal (FIG. 7). The 300–500 $\mu$m thick layer immediately below the diamond inverse opal is a volumetric inverse opal (or a heavily filled surface inverse opal) consisting of graphitic carbon, which tends to separate from the diamond inverse opal layer during $SiO_2$ extraction. The innermost layer in the deposited carbon is composed of a new type of carbon phase, which we call a cubic graphite phase (FIGS. 8 and 10). In contrast with the case for the carbon photonic crystals that we have previously described, the atomic arrangement of graphite sheets is determined by the cubic structure existing at optical wavelengths. Hence the name cubic graphite. This cubic graphite phase comprises graphitic sheets that are tiled upon each other—reminiscent of the structure of carbon onions (which are carbon particles consisting of concentric graphitic shells). The number of such layers depends upon deposition conditions and generally decreases with increasing separation from the infiltration surface (within 200 $\mu$m thick sheets of surface inverse opal). However, a 40 Å layer thickness is typical for the innermost structure. The void structure of the original opal is precisely replicated in the carbon phase—indicating that these 40 Å thick stacks are sufficiently strong to survive the stresses generated during the dissolution of the $SiO_2$ spheres. An electron diffraction pattern from cubic graphite provides diffraction spacings close to that of ordinary graphite: 3.43 Å for (002), 2.10 Å for (100), 1.72 Å for (004), and 1.23 Å for (110). As expected because of the nested type of structure, the absence of reflections other than (hk0) or (001) indicates that the carbon layers are not in lateral registry.

EXAMPLE 14

This example demonstrates the preparation of an inverse opal of a ferroelectric polymer. A piece of the porous $SiO_2$ opal of the type described in Example 1 was placed into a 50 wt % solution of (50/50) poly(vinylidene difluoride-co-trifluoroethylene) in cyclohexanone. After 20 hours at 155° C., the cyclohexanone was removed under vacuum at 130° C. During this process, the copolymer continuously infiltrated into the opal as the polymer concentration increased. After removing the solvent, the copolymer-infiltrated opal was separated from the surrounding polymer and its surfaces were polished. The infiltrated opal was broken into two pieces. One was examined by scanning electron microscope (SEM) and the other was treated in hydrofluoric acid (Aldrich, 48 wt. % in water) to remove the $SiO_2$ spheres, and then repeatedly washed with water. The SEM micrographs of the first piece show that the $SiO_2$ spheres were surface coated by the copolymer. The HF treated sample shows intense opalescence, indicating that an inverse opal had been formed from a piezoelectric polymer.

EXAMPLE 15

This example demonstrates the infiltration of silicon into a porous $SiO_2$ opal of Example 1, so as to provide closely spaced, non-percolated silicon particles infiltrated within the void space of this opal. An opal sheet (having a thickness of 1 mm, a length of 60 mm, and a wide of 20 mm) was placed into the CVD chamber and evacuated to $10^{-3}$ mtorr. Afterwards, the precursor gas composed of 97% nitrogen and 3% silane ($SiH_4$) was introduced into the CVD chamber at ambient temperature. This precursor gas was delivered with the rate 300 $cm^3$ per minute in order to maintain the pressure 400 mtorr. The temperature was then increased up to 600° C. and held at this temperature for 5 hours. The resulting weight gain of the opal sample caused by the silicon infiltration was about 3% (a portion of which was in a very thin surface layer).

Examination of the fracture surface of this opal sheet showed that the silicon has deposited throughout the opal sample (which was visually indicated by the red coloration throughout the sample thickness). SEM micrographs shows that this deposited silicon is in the form of closely spaced, non-percolated particles within the opal void space. This silicon infiltrated opal is useful for embodiments of the present invention where a low-work-function thermionic material is generated by subsequent exposure of the silicon particle within the opal to cesium gas, which creates a low-work-function cesium-coated silicon surface. For the purpose of this application mode, the silicon filing should be either the present non-percolated particle type of filling or a non-percolated patch-type coating on the spheres. Application of the above type of silicon CVD process to a surface-templated or a volumetrically-templated carbon inverse opal (or a porous direct opal made of carbon spheres), so as to provide a uniform surface coating with silicon (followed by the removal of the carbon, by low temperature combustion of the carbon or removal of the carbon by hydrogen plasma) will result in a silicon-based photonic bandgap crystal.

EXAMPLE 16

Figure 13:
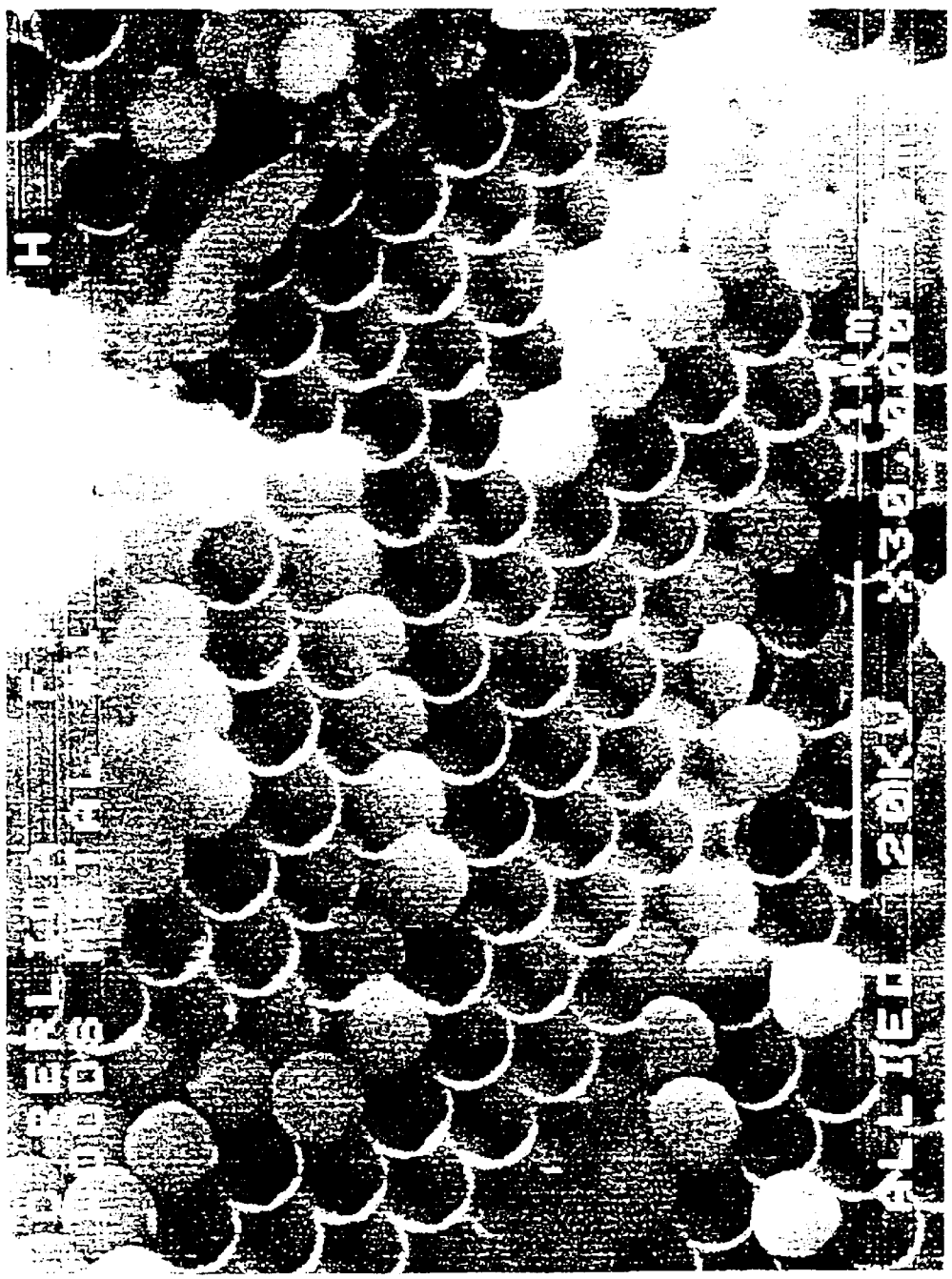
FIG. 13 is a scanning electron micrograph of a metal/glassy-carbon composite (made by the process embodiment of Example 16) that consists of a phenolic-derived glassy-carbon inverse opal whose network on interconnected spherical voids are filled with a metal alloy. An accelerating voltage of 20 kV was chosen for this micrograph so that the penetration depth of the electron beam in carbon was longer than the wall thickness for the carbon matrix. These walls are then semi-transparent to the electrons, which enables the underlying layer of ordered metal spheres to be clearly seen.

This example demonstrates the preparation of a metal/glassy-carbon composite that consists of a phenolic-derived glassy-carbon inverse opal which is filled with an alloy. The glassy-carbon inverse opal was made by the process described in Example 3. A piece of the glassy-carbon inverse opal was placed in a capsule, which was tightly filled with a powder of Woods metal (Bi:50%, Pb:25%, Sn:12.5%, Cd:12.5% alloy) and hermetically sealed. The impregnation of the inverse opal with metal occurred upon heating the capsule to the melting point of the powder under small external pressure (0.1–3 kbar) for 1–30 minutes. The impregnation from the melt under isostatic conditions excluded any distortions of periodic matrix of the inverse opal. Electron micrographs in FIG. 13 indicate that the three-dimensional structure of inverse opal matrix was filled with Wood's metal. An accelerating voltage of 20 kV was chosen for this micrograph so that the penetration depth of the electron beam in carbon was longer than the wall thickness for the carbon matrix. These walls are then semi-transparent to the electrons, which enables the underlying layer of ordered metal spheres to be clearly seen in FIG. 13.

EXAMPLE 17

Figure 14:
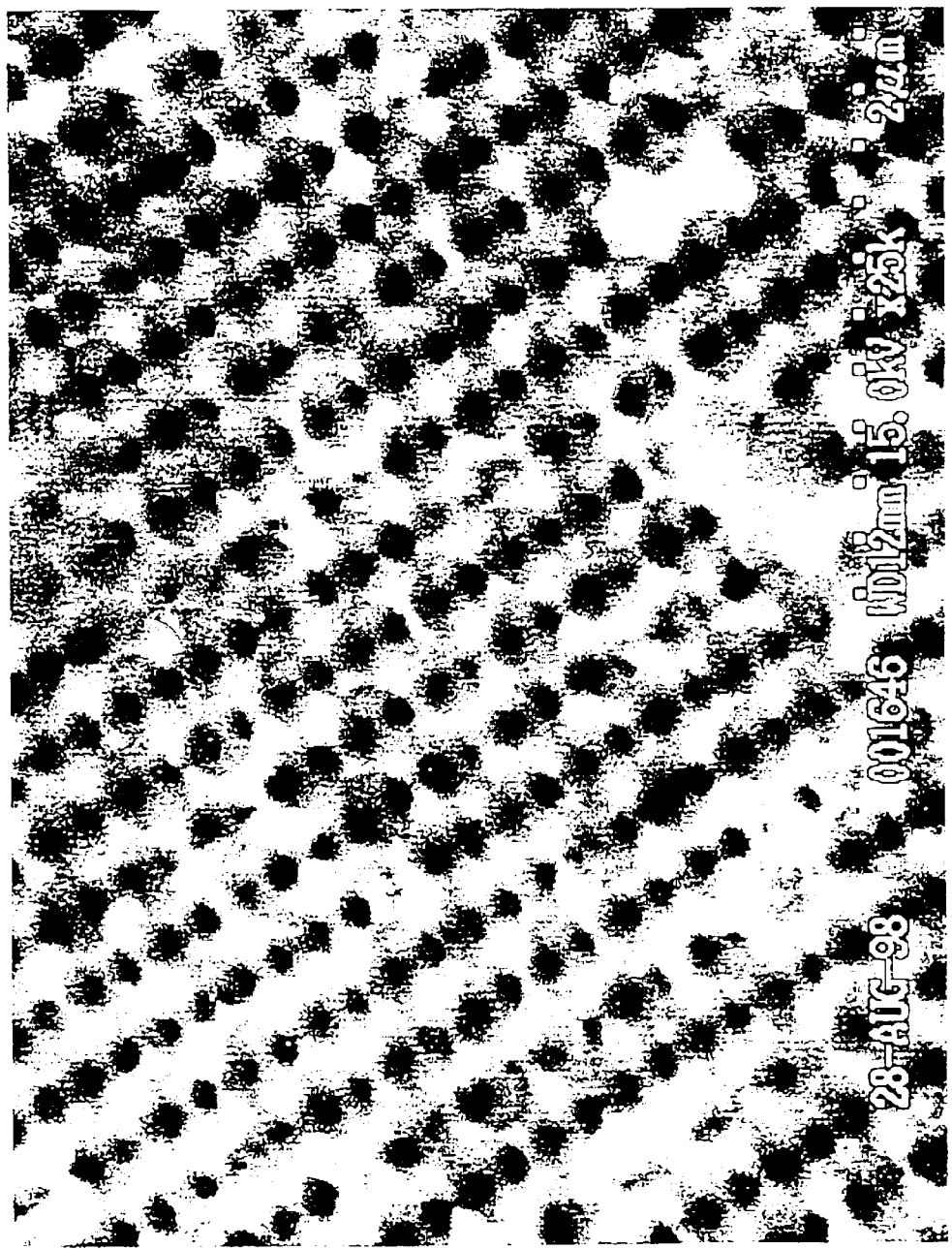
FIG. 14 is a scanning electron micrograph of a bismuth inverse opal made by the process embodiment of Example 17.

This example demonstrates the preparation of an inverse opal made of bismuth (FIG. 14). In a typical solid sample preparation, a rectangular piece of opal (with average size 6×6×8 $mm^3$) was surrounded with 200 mesh Bi powder (99.999% purity from Alfa Aesar) that was contained in a 9 mm diameter stainless steel cylinder. Using a piston-cylinder pressure cell, this cylinder was held at 300–350° C. under a pressure of 8–10 kbar for 1–2 hours. During this process, molten Bi infiltrated into the opal and filled the void space. After cooling under pressure and return to ambient temperature, the opal samples were carefully cut from the surrounding Bi matrix using a jeweler's saw and polished. The resulting Bi-infiltrated opal samples had an average cross-section of 5×5 $mm^2$ and a thickness varying between 2 and 5 mm from sample to sample. The Bi-impregnated opal was placed in 48% hydrofluoric acid for 24 hours. Subsequently, it was washed with deionized water and acetone in an inert atmosphere and dried in vacuum. FIG. 14 shows that the acid dissolved the $SiO_2$ spheres in the system and did not react with the bismuth.

What is claimed is:

1. A process for the formation of a three-dimensionally-periodic porous structure, comprising the steps of
    (a) crystallizing spheres of material A into a first structure having three-dimensional periodicity, and voids between spheres, wherein the material A is mechanically and thermally stable to at least about 300° C.,
    (b) treating this first structure so that necks are formed between the spheres of material A,
    (c) infiltrating said first structure with material B to form a A-B composite structure, and
    (d) removing material A from said A-B composite structure to form a second structure comprising material B.

2. The process of claim 1, wherein the first structure is either cubic, hexagonal, or a mixture of face-centered cubic and hexagonal packing arrangements; the spheres of material A are substantially monodispersed; said material B is comprised of a form of elemental carbon; and the three-dimensional periodicity of the first structure is replicated in the said second structure.

3. The process of claim 1, wherein the first structure comprises an array of $SiO_2$ spheres having diameters of from about 20 nm to about 100 $\mu$m and wherein the infiltration is by a melt infiltration process that substantially completely fills the space between spheres A.

4. The process of claim 1, wherein the removal of the material A is by treatment with either an acid, a base, or a solvating or reacting chemical at a temperature of about 200° C. or below.

5. The process of claim 1, wherein the first structure is either body-centered-cubic or hexagonal close-packed and wherein the three-dimensional periodicity of the said first structure is replicated in the said second structure.

6. The process of claim 1, wherein the infiltration of said first structure with material B results in the filling of substantially the entire space between spheres A.

7. The process of claim 1, wherein the infiltration of said first structure with material B results in the filling of less than about 10% of the space between spheres A.

8. The process of claim 1, wherein the spheres of material A are crystallized into a cubic or hexagonal sphere array, or mixture of cubic and hexagonal arrays, and wherein these sphere arrays of material B are mechanically deformed to decrease symmetry either prior to or after the infiltration step (c).

9. The process of claim 1, wherein the step (a) crystallizing of the spheres of material A is accomplished with the spheres on a substrate and the thickness of the crystallized sphere array on the substrate is less than about 1 mm.

10. The process of claim 1 wherein said material B comprises either a ferroelectric material or an electrostrictive material, wherein said electrostrictive material can provide a fractional dimension change of at least about one percent in response to an applied electric field.

11. The process of claim 1, wherein material B is a carbon precursor or carbon/silicon precursor and the process comprises an additional step of thermally converting this carbon precursor to a form of elemental carbon or the carbon/silicon precursor to a carbon/silicon mixture.

12. The process of claim 1 wherein material B comprises either a graphitic or glassy carbon or a material that is converted to a graphitic or glassy carbon, which process further comprises an additional process step in which the form of elemental carbon is treated to increase surface area.

13. The process of claim 1 wherein the material B comprises either a metallic conductor, an elemental metal, a thermoelectric, a ferroelectric, or a ferromagnet.

14. The process of claim 1 that additiolly comprises infiltrating the material obtained from step (d) with a material C to form a B-C composite structure having three-dimensional periodicity.

15. The process of claim 1, wherein said first structure comprises an array of at least two or more sphere diameters, each of which is from about 20 nm to about 100 $\mu$m.

16. The process of claim 1, wherein the said first structure additionally comprises cylinders of material $A_1$, having monodispersed diameters, wherein this first structure in obtained by the crystallization of said materials A and $A_1$.

17. The process of claim 1 wherein the material B comprises an organic polymer.

18. The process of claim 17 wherein the organic polymer is comprised of a block copolymer.

19. The process of claim 1 wherein the infiltration is by a chemical vapor deposition process.

20. The process of claim 2, wherein said form of elemental carbon comprises diamond.

21. The process of claim 7, wherein the material B is comprised of graphite.

22. The process of claim 9 wherein steps (a)–(d) are accomplished on said substrate and said substrate is substantially planar.

23. The process of claim 22, wherein said substrate is patterned with a periodic array of holes, troughs, or protuberances, and such results in a crystallographically oriented crystallization of the spheres of material A.

24. The process of claim 11, wherein said carbon or carbon/silicon precursor comprises a phenolic derived polymer, a furfuryl alcohol derived polymer, or a silicon-containing acetylenic polymer.

25. The process of claim 14 wherein the material B in said B-C composite structure is partially or substantially completely removed to form a three-dimensionally periodic structure comprising the material C.

26. The process of claim 15, wherein said first structure comprises a periodic array of two different diameters of monodispersed spheres, N and M, wherein this array has the composition $MN_{13}$ or $MN_2$ and the radius of the N spheres are smaller than for the M spheres.

27. The process of claim 17 wherein the organic polymer is comprised of a piezoelectric polymer, an elastomer, or a conducting polymer.

28. The process of claim 1 wherein the first structure having three-dimensional periodicity is treated with a reagent that increases void volume, prior to the infiltration of material B.

* * * * *